(12) United States Patent
Moon et al.

(10) Patent No.: US 7,030,947 B2
(45) Date of Patent: Apr. 18, 2006

(54) REFLECTIVE LIQUID CRYSTAL DISPLAY DEVICE

(75) Inventors: Jong-Weon Moon, Anyang-si (KR); Mun-Chul Kim, Anyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 79 days.

(21) Appl. No.: 10/667,460

(22) Filed: Sep. 23, 2003

(65) Prior Publication Data
US 2004/0125286 A1 Jul. 1, 2004

(30) Foreign Application Priority Data
Dec. 27, 2002 (KR) ............... 10-2002-0085360

(51) Int. Cl.
*G02F 1/1333* (2006.01)
(52) U.S. Cl. .................. 349/110; 349/38
(58) Field of Classification Search ............ 349/110, 349/38, 147, 148, 111, 113
See application file for complete search history.

(56) References Cited
U.S. PATENT DOCUMENTS
5,708,485 A * 1/1998 Sato et al. ............. 349/42
6,084,651 A * 7/2000 Yamahara et al. ........ 349/118

OTHER PUBLICATIONS

Bahadur, Liquid Crystals 1990, World Scientific, vol. 1, pp. 178-181, 189, 190.*

* cited by examiner

*Primary Examiner*—Kenneth Parker
*Assistant Examiner*—David Chung
(74) *Attorney, Agent, or Firm*—McKenna Long & Aldridge LLP

(57) ABSTRACT

A reflective liquid crystal display device includes first and second substrates spaced apart and facing each other, a gate line and a data line on an inner surface of the first substrate and crossing each other to define a pixel area, a thin film transistor electrically connected to the gate and data lines, a passivation layer covering the thin film transistor, a blocking layer on the passivation layer and corresponding to the thin film transistor, a pixel electrode on the passivation layer and connected to the thin film transistor, a retardation film on an outer surface of the first substrate, a polarizer on the retardation film, an absorption layer on an inner surface of the second substrate, a cholesteric liquid crystal color filter layer on the absorption layer, a common electrode on the cholesteric liquid crystal color filter layer, and a liquid crystal layer between the common electrode and the pixel electrode, wherein the data line overlaps adjacent pixel electrodes and a overlapping width is over 50% of a width of the data line.

26 Claims, 19 Drawing Sheets

REFLECTIVE LIQUID CRYSTAL DISPLAY DEVICE

The present invention claims the benefit of Korean Patent Application No. 2002-85360, filed in Korea on Dec. 27, 2002, which is hereby incorporated by reference for all purposes as of fully set forth herein.

BACKGROUND OF THE INVENTION

1. Field of the Invention

The present invention relates to a liquid crystal display (LCD) device and more particularly, to a reflective liquid crystal display device having a cholesteric color filter layer.

2. Discussion of the Related Art

A liquid crystal display (LCD) device has been in the spotlight as a next generation display device having high value added because of its low power consumption and good portability.

An active matrix liquid crystal display (AMLCD) device, which includes thin film transistors as a switching device for a plurality of pixels, has been widely used due to its high resolution and fast moving images.

Because the LCD device is not luminescent, it needs an additional light source in order to display images. In general, the LCD device has a backlight behind a liquid crystal panel as a light source, and such a LCD is usually referred to as a transmissive LCD device. In the transmissive type, light incident from the backlight penetrates the liquid crystal panel, and the amount of the transmitted light is controlled according to the alignment of liquid crystal molecules. Because the transmissive LCD device uses the backlight as a light source, it can display a bright image in dark surroundings. However, the amount of the transmitted light is very small for the amount of light incident from the backlight. That is, because only 7% of the light incident from the backlight is transmitted through the liquid crystal panel, the brightness of the backlight should be increased in order to increase the brightness of the LCD device. Consequently, the transmissive LCD device has high power consumption due to the backlight.

To solve the problems in the transmissive LCD device, a reflective LCD device has been proposed. In the reflective LCD device, sunlight or artificial light is used as a light source of the LCD device. The light incident from the outside is reflected at a reflective plate of the LCD device according to the arrangement of the liquid crystal molecules. Since there is no backlight, the reflective LCD device has much lower power consumption than the transmissive LCD device. By the way, the reflective LCD device, generally, includes an absorptive color filter layer, which is made of pigments or dyes, the same as the transmissive LCD device. The reflective LCD device also has a disadvantage of low light transmittance due to the absorptive color filter layer.

To improve the light transmittance in the reflective LCD device, a cholesteric liquid crystal (CLC) color filter has been researched and developed. As the CLC color filter selectively reflects and transmits light, the CLC color filter can emit light of high purity in color. Additionally, the CLC color filter functions both as a color filter layer and as a reflector. Therefore, since the reflective LCD device including the CLC color filter does not require an additional reflector, manufacturing processes are decreased and image quality is improved.

Liquid crystal molecules of the CLC are arranged in a helical structure. The helical structure is characterized by a helical direction and a pitch, which is a cycle of the helical structure. A color tone of light reflected by the CLC depends on the pitch. That is, an average wavelength of the reflected light is the pitch times an average reflective index of the CLC, and is represented by the following formula.

$$\lambda = n(avg) \cdot pitch,$$

wherein the n(avg) is the average reflective index of the CLC.

For example, if the CLC has the average reflective index of about 1.5 and the pitch of the CLC is about 430 nm, the light reflected by the CLC has the average wavelength of about 650 nm, and is reddish. Greenish or bluish light may be reflected by changing the pitch of the CLC.

A reflective LCD device including a CLC color filter will be explained in detail with reference to the following figures.

FIG. 1 is a plan view of a reflective LCD device including a cholesteric liquid crystal (CLC) color filter according to the related art. As shown in the figure, a gate line 22 of a horizontal direction and a data line 32 of a vertical direction in the context of the figure cross each other to define a pixel area. A thin film transistor, which includes a gate electrode 24, a source electrode 34 and a drain electrode 36, is formed at the crossing of the gate line 22 and the data line 32 to function as a switching element. The gate electrode 24 is connected to the gate line 22; the source electrode 34 is connected to the data line 32; and the drain electrode 36 is spaced apart from the source electrode 34. The thin film transistor further includes an active layer 28, and the active layer 28 between the source electrode 34 and the drain electrode 36 becomes a channel of the thin film transistor. A passivation layer 40 is formed over the thin film transistor.

A capacitor electrode 37 overlaps the gate line 22 to form a storage capacitor. The capacitor electrode 37 may be made of the same material as the data line 32.

In the pixel area, a pixel electrode 42 is formed. The pixel electrode 42 is connected to the drain electrode 36 through a drain contact hole 40a through the passivation layer 40 and is connected to the capacitor electrode 37 through a capacitor contact hole 40b through the passivation layer 40. The pixel electrode 42 overlaps the data line 32.

To prevent light leakage in a region except for the pixel area, a black matrix 38 is formed corresponding to edges of the pixel electrode 42. The black matrix 38 also covers a part of the gate line 22, the data line 32 and the channel of the thin film transistor.

Although not shown in the figure, a CLC color filter layer is formed, and the CLC color filter layer reflects light of wavelengths corresponding to one of red, green and blue colors by pixel areas.

FIGS. 2A and 2B are cross sectional views along the line IIA—IIA and the line IIB—IIB of FIG. 1, respectively.

In FIGS. 2A and 2B, a first substrate 10 and a second substrate 50 are spaced apart and facing each other. The first substrate 10 may be made of a transparent substrate. A gate electrode 24 is formed on an inner surface of the first substrate 10, and a gate insulating layer 26 covers the gate electrode 24. An active layer 28 is formed on the gate insulating layer 26 over the gate electrode 24, and a source electrode 34 and a drain electrode 36 are formed on the active layer 28. As state above, the gate electrode 24, the active layer 28, the source electrode 34 and the drain electrode 36 form a thin film transistor, and the active layer 28 exposed between the source electrode 34 and the drain electrode 36 becomes a channel of a thin film transistor.

Additionally, a data line 32, which is made of the same material as the source electrode 34 and the drain electrode 36, is formed on the gate insulating layer 26.

A black matrix 38 is formed on the data line 32, the source electrode 34 and the drain electrode 36, and covers the data line 32 and the channel of the thin film transistor. The black matrix 38 may be made of a black resin. The black matrix 38 blocks light leakage in edge portions of a pixel area, that is, close by the data line 32, and prevents light from reaching the channel of the thin film transistor.

A passivation layer 40 is formed on the black matrix 38, and the passivation layer 40 is made of an organic material having a relatively low dielectric constant. The passivation layer 40 includes a drain contact hole 40a exposing the drain electrode 36.

A pixel electrode 42 is formed on the passivation layer 40, and the pixel electrode 42 is connected to the drain electrode 36 through the drain contact hole 40a. The pixel electrode 42 may overlap the data line 32 to increase an aperture ratio of the LCD device.

On the other hand, an absorption layer 52 is formed on an inner surface of the second substrate 50, and a CLC color filter layer, which includes sub color filters 54a and 54b, is formed on the absorption layer 52. Each sub color filter of the CLC color filter layer 54a and 54b corresponds to one pixel area and reflects light of wavelengths corresponding to one of red, green and blue colors. A common electrode 56 is formed on the CLC color filter layer 54a and 54b. The common electrode 56 is made of a transparent conducting material.

A liquid crystal layer 60 is disposed between the common electrode 56 and the pixel electrode 42.

A retardation film 72 and a polarizer 74 are subsequently arranged on an outer surface of the first substrate 10. The retardation film 72 may be a quarter wave plate (QWP) having a retardation of λ/4, and the polarizer 74 may be a linear polarizer that transmits only linearly polarized light parallel to its transmission axis.

Like this, the black matrix is formed to prevent photocurrent from being generated in the thin film transistor due to light and to block light leakage nearby the data line. However, since the black matrix of the related art is made of a resin that has relatively a low resistivity and a high dielectric constant, leakage current may be generated in the thin film transistor.

SUMMARY OF THE INVENTION

Accordingly, the present invention is directed to a reflective liquid crystal display device that substantially obviates one or more of problems due to limitations and disadvantages of the related art.

An advantage of the present invention is to provide a reflective liquid crystal display device that prevents leakage current from being generated.

Another advantage of the present invention is to provide a reflective liquid crystal display device that blocks light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes first and second substrates spaced apart and facing each other, a gate line and a data line on an inner surface of the first substrate and crossing each other to define a pixel area, a thin film transistor electrically connected to the gate and data lines, a passivation layer covering the thin film transistor, a blocking layer on the passivation layer and corresponding to the thin film transistor, a pixel electrode on the passivation layer and connected to the thin film transistor, a retardation film on an outer surface of the first substrate, a polarizer on the retardation film, an absorption layer on an inner surface of the second substrate, a cholesteric liquid crystal color filter layer on the absorption layer, a common electrode on the cholesteric liquid crystal color filter layer, and a liquid crystal layer between the common electrode and the pixel electrode, wherein the data line overlaps adjacent pixel electrodes and a overlapping width is over 50% of a width of the data line.

In another aspect, a reflective liquid crystal display device includes first and second substrates spaced apart and facing each other, a gate line and a data line on an inner surface of the first substrate and crossing each other to define a pixel area, a thin film transistor electrically connected to the gate and data lines, a passivation layer covering the thin film transistor, a blocking layer on the passivation layer and corresponding to the thin film transistor, first and second black matrices on the passivation layer and overlapping respective sides of the data line, a pixel electrode on the passivation layer, the pixel electrode connected to the thin film transistor and overlapping the first and second black matrices, a retardation film on an outer surface of the first substrate, a polarizer on the retardation film, an absorption layer on an inner surface of the second substrate, a cholesteric liquid crystal color filter layer on the absorption layer, a common electrode on the cholesteric liquid crystal color filter layer, and a liquid crystal layer between the common electrode and the pixel electrode.

In another aspect, a reflective liquid crystal display device includes first and second substrates spaced apart and facing each other, first and second black matrices on an inner surface of the first substrate, a gate line on the inner surface of the first substrate, a data line crossing the gate line to define a pixel area and overlapping the first and second black matrices, a thin film transistor electrically connected to the gate and data lines, a passivation layer covering the thin film transistor, a blocking layer on the passivation layer and corresponding to the thin film transistor, a pixel electrode on the passivation layer, the pixel electrode connected to the thin film transistor and overlapping the first and second black matrices, a retardation film on an outer surface of the first substrate, a polarizer on the retardation film, an absorption layer on an inner surface of the second substrate, a cholesteric liquid crystal color filter layer on the absorption layer, a common electrode on the cholesteric liquid crystal color filter layer, and a liquid crystal layer between the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 3:
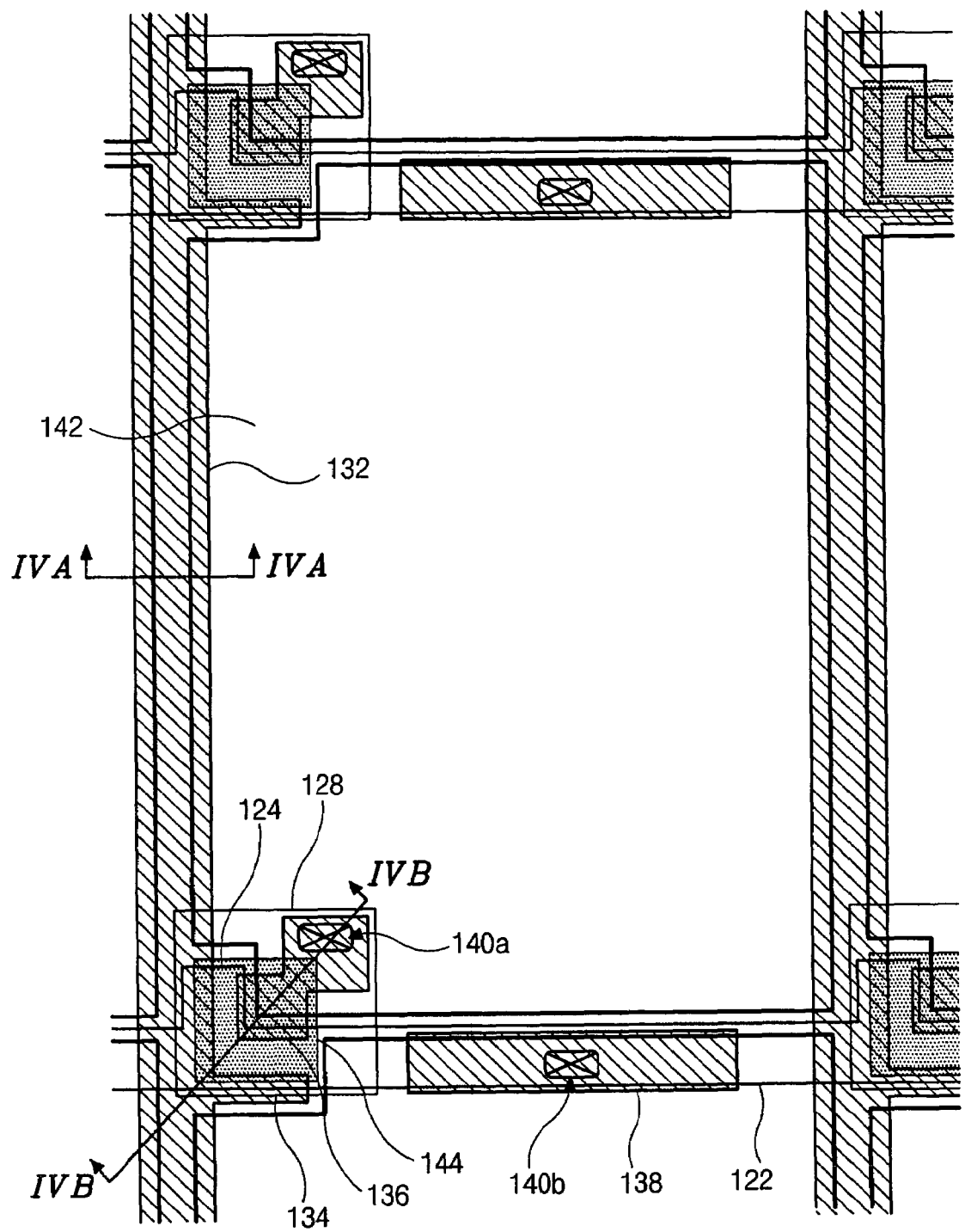
FIG. 3 is a plan view of a reflective LCD device including a CLC color filter according to a first embodiment of the present invention.

FIG. 3 is a plan view of a reflective liquid crystal display (LCD) device including a cholesteric liquid crystal (CLC) color filter according to a first embodiment of the present invention. As shown in FIG. 3, a gate line 122 of a horizontal direction and a data line 132 of a vertical direction in the context of the figure cross each other to define a pixel area. A gate electrode 124, a source electrode 134 and a drain electrode 136 are formed at the crossing of the gate line 122 and the data line 132. The gate electrode 124 is connected to the gate line 122; the source electrode 134 is connected to the data line 132; and the drain electrode 136 is spaced apart from the source electrode 134. The gate electrode 124, the source electrode 134 and the drain electrode 136 form a thin film transistor that functions as a switching element. The thin film transistor further includes an active layer 128, and the active layer 128 between the source electrode 134 and the drain electrode 136 becomes a channel of the thin film transistor. A passivation layer 140 is formed over the thin film transistor.

Also, a channel blocking layer 144 is formed at the crossing of the gate line 122 and the data line 132 and covers the channel of the thin film transistor.

A capacitor electrode 138 overlaps the gate line 122 to form a storage capacitor. The capacitor electrode 138 may be made of the same material as the data line 132.

In the pixel area, a pixel electrode 142 is formed. The pixel electrode 142 overlaps the drain electrode 136, and a drain contact hole 140a is formed through the passivation layer 140 at the overlapping portion of the pixel electrode 142 and the drain electrode 136. The pixel electrode 142 is connected to the drain electrode 136 through the drain contact hole 140a and is connected to the capacitor electrode 138 through a capacitor contact hole 140b through the passivation layer 140. The pixel electrode 142 also overlaps the data line 132. Thus, the pixel electrode 142 gets larger and the data line 132 functions as a black matrix, so that the aperture ratio of the LCD device increases.

Although not shown in the figure, a CLC color filter layer is formed, and the CLC color filter layer reflects light of wavelengths corresponding to one of red, green and blue colors by pixel areas.

Figure 4A:
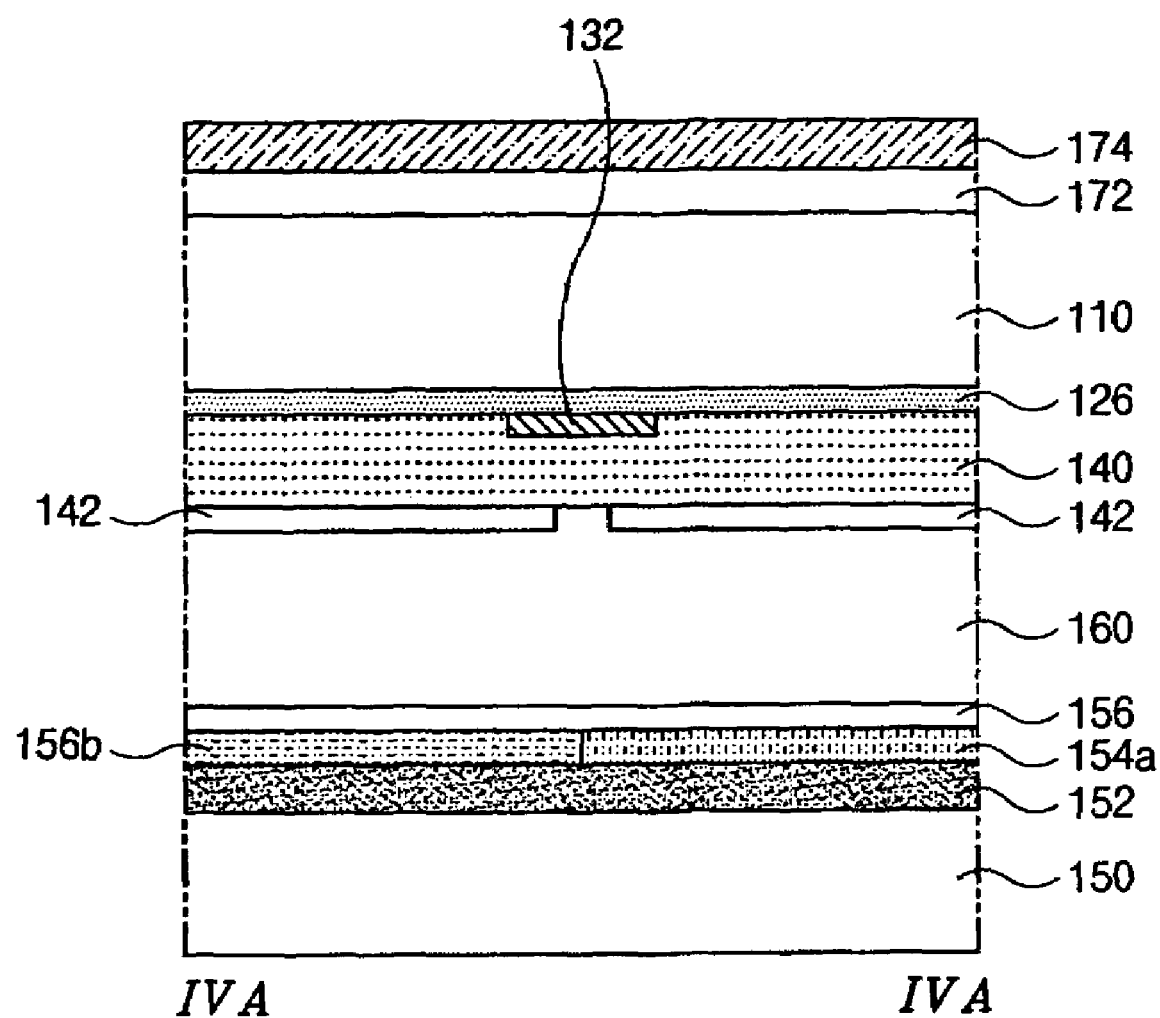
FIGS. 4A and 4B are cross sectional views along the line IVA—IVA and the line IVB—IVB of FIG. 3, respectively.
Figure 4B:
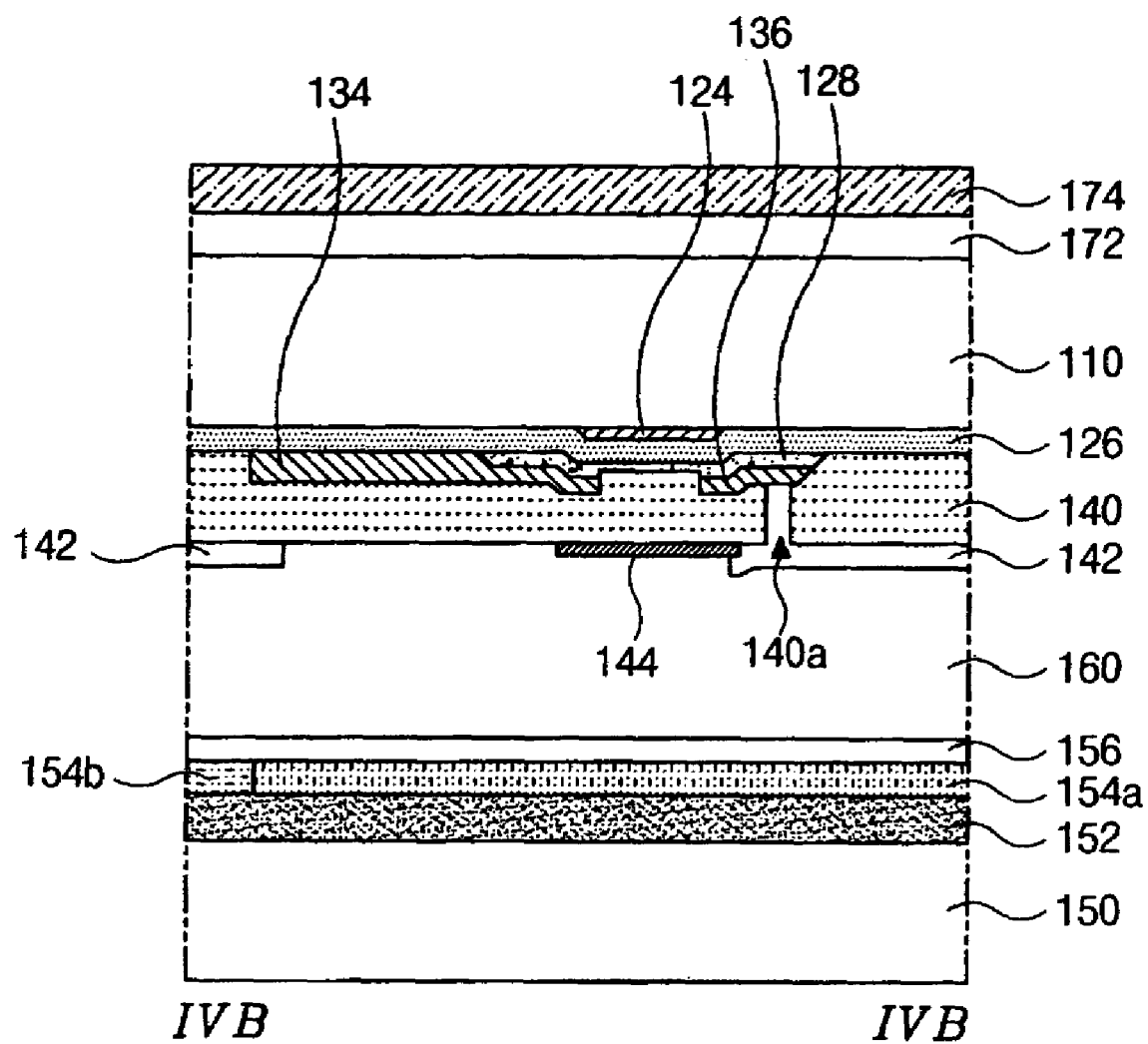

FIGS. 4A and 4B are cross sectional views along the line IVA—IVA and the line IVB—IVB of FIG. 3, respectively.

Figure 1:
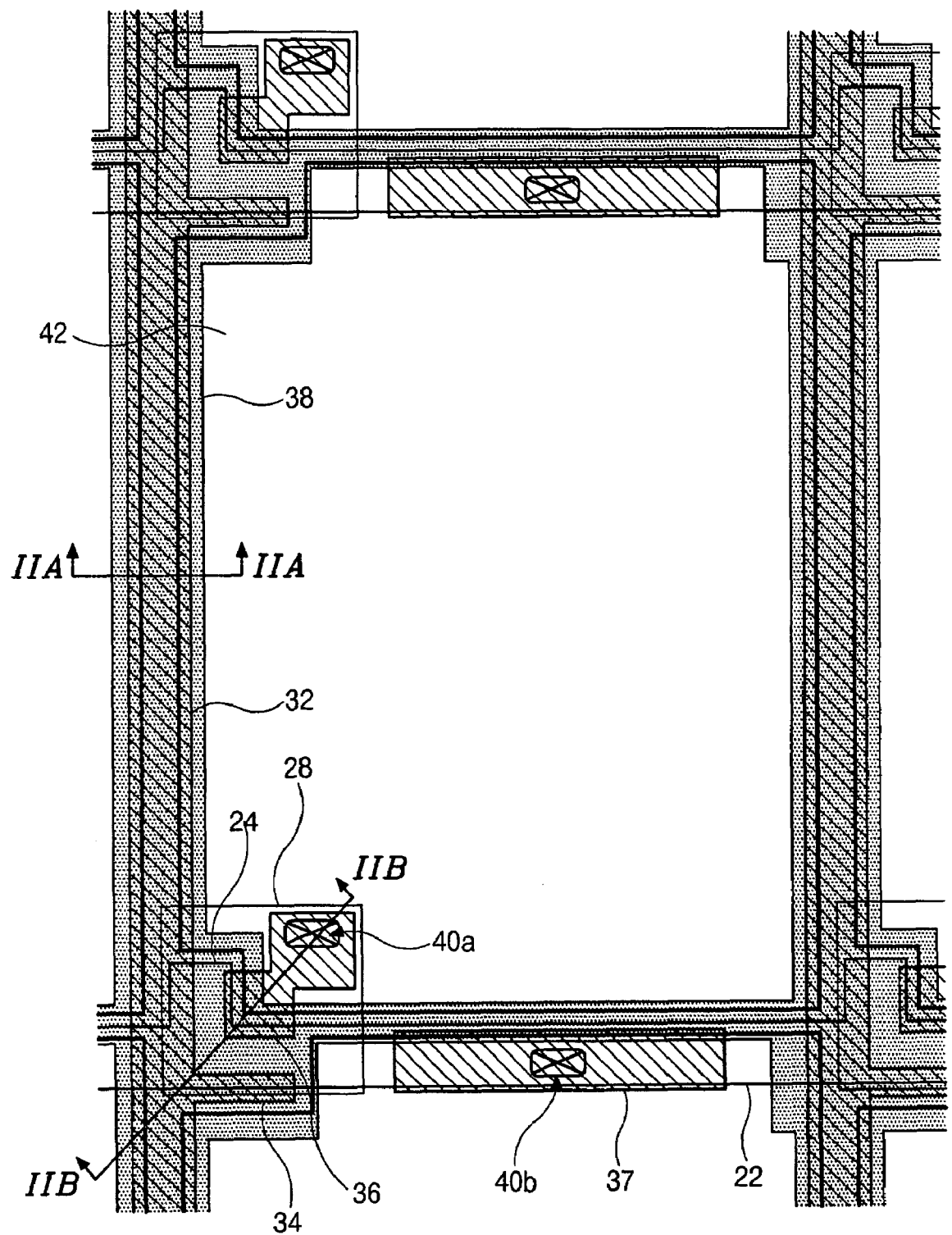
FIG. 1 is a plan view of a reflective liquid crystal display (LCD) device including a cholesteric liquid crystal (CLC) color filter according to the related art.
Figure 2A:
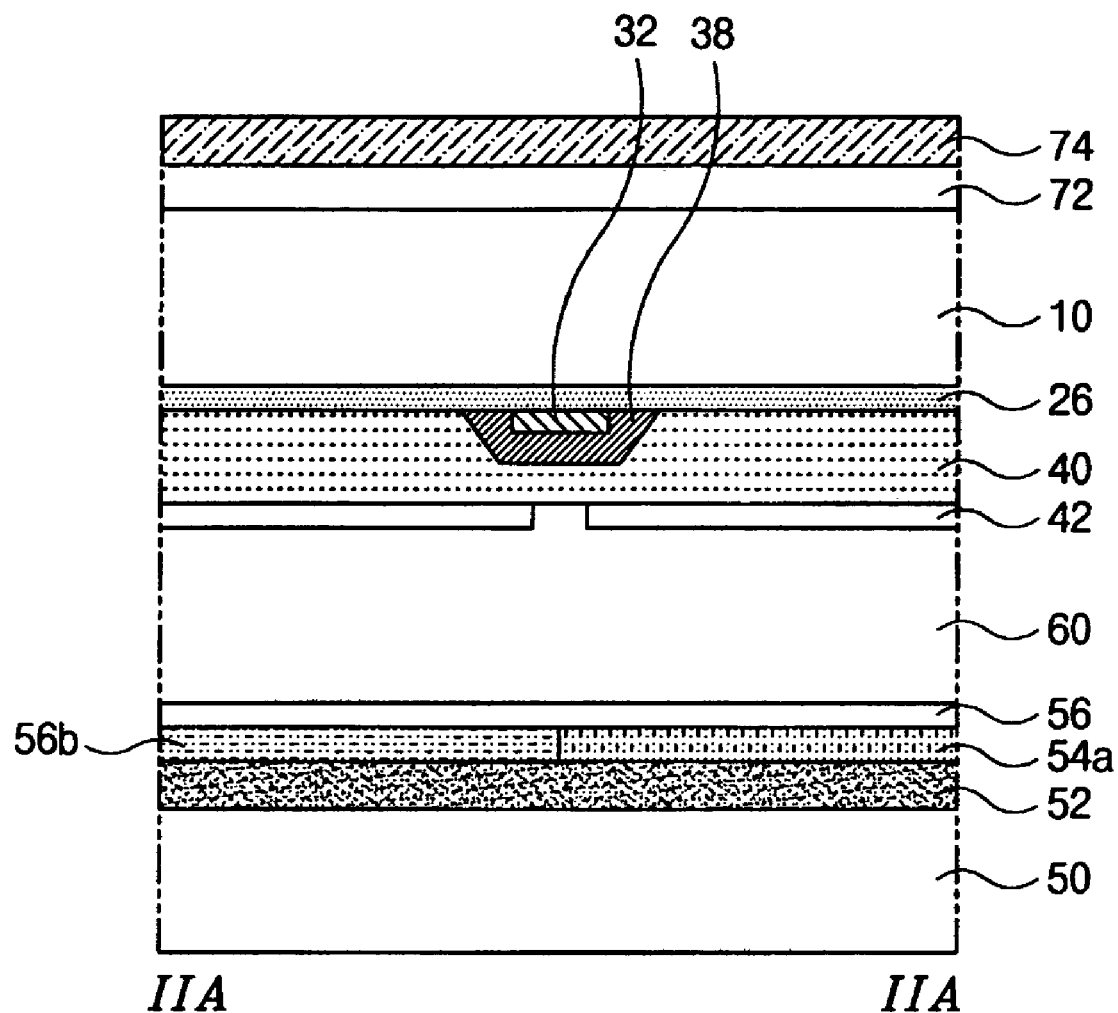
FIGS. 2A and 2B are cross sectional views along the line IIA—IIA and the line IIB—IIB of FIG. 1, respectively.
Figure 2B:
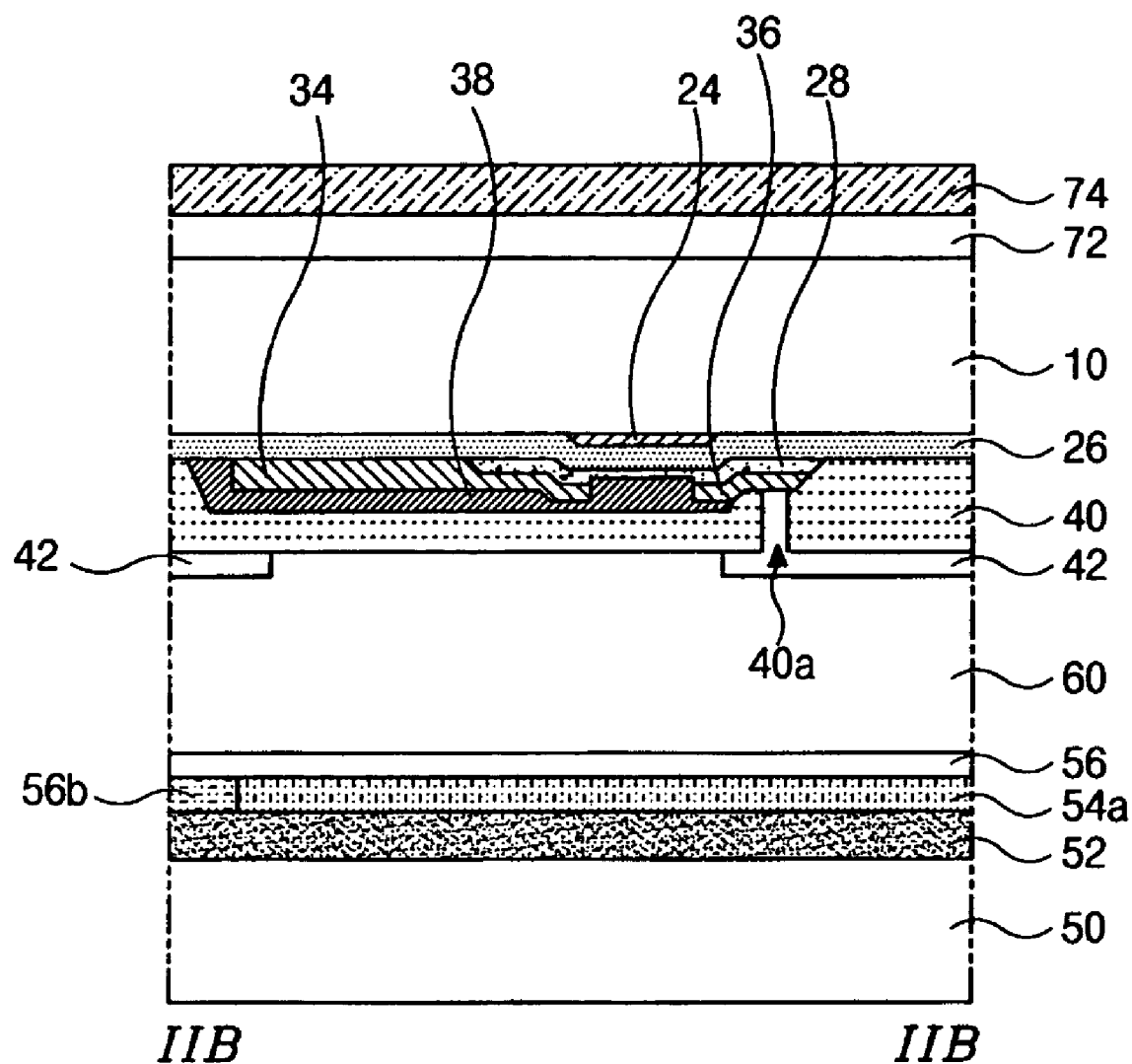

As shown in the figures, a first substrate 110 and a second substrate 150 are spaced apart and facing each other. The first substrate 110 may be made of a transparent substrate, and the second substrate 150 may be made of either a transparent substrate or an opaque substrate. A gate electrode 124 is formed on an inner surface of the first substrate 110, and a gate insulating layer 126 covers the gate electrode 124. Although not shown in the figures, a gate line 122 of FIG. 2 that is connected to the gate electrode 124 also is formed on the inner surface of the first substrate 110. An active layer 128 is formed on the gate insulating layer 126 over the gate electrode 124, and a source electrode 134 and a drain electrode 136 are formed on the active layer 128. As stated above, the gate electrode 124, the active layer 128, the source electrode 134 and the drain electrode 136 form a thin film transistor, and the active layer 128 exposed between the source electrode 134 and the drain electrode 136 becomes a channel of the thin film transistor. Additionally, a data line 132 and a capacitor electrode 138 of FIG. 3, which may be made of the same material as the source electrode 134 and the drain electrode 136, are formed on the gate insulating layer 126. The data line 132 is connected to the source electrode 134, and crosses the gate line to define a pixel area. The capacitor electrode overlaps the gate line. Here, the data line 132 has a width of over about 8 μm. Although not shown in the figures, an ohmic contact layer may be formed between the active layer 128 and the source electrode 134 and between the active layer 128 and the drain electrode 136 to lower the contact resistance.

The passivation layer 140 is formed on the data line 132, the source electrode 134 and the drain electrode 136. The passivation layer 140 may be made of an organic material having a relatively low dielectric constant, such as benzocyclobutene (BCB) or acrylic resin. The passivation layer 140 includes a drain contact hole 140a exposing the drain electrode 136 and a capacitor contact hole 140b of FIG. 3 exposing the capacitor electrode 138 of FIG. 3.

Next, a blocking layer 144 is formed on the passivation layer 140 to cover the channel of the thin film transistor. The blocking layer 144 may be made of an opaque metal material, such as chromium (Cr). The blocking layer 144 blocks light incident to the channel, and thus prevents leakage current from generating.

As illustrated in FIG. 4B, a pixel electrode 142, which may be made of a transparent conducting material, such as indium-tin-oxide (ITO) or indium-zinc-oxide (IZO), may be formed on at least a portion of the blocking layer 144 and on the passivation layer 140. The pixel electrode 142 is connected to the drain electrode 136 through the drain contact hole 140a and to the capacitor electrode through the capacitor contact hole. The pixel electrode 142 may overlap the data line 132 to increase an aperture ratio of the LCD device. As shown in the figures, the pixel electrode 142 may contact and overlap the blocking layer 144, such that a portion of the blocking layer 144 is between the passivation layer 140 and the pixel electrode 142

Figure 4C:
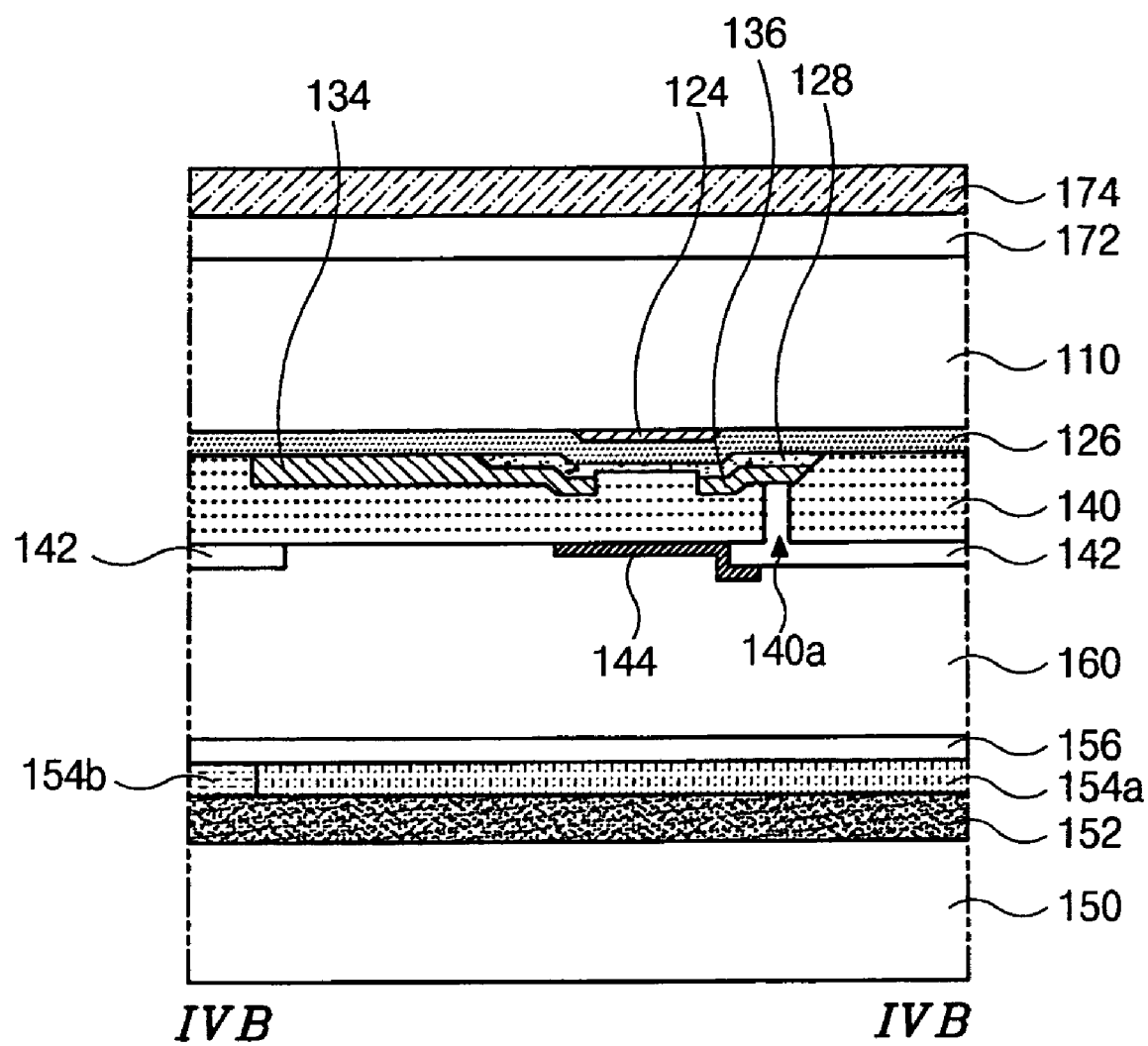
FIG. 4C illustrates another aspect of the present invention along line IVB—IVB of FIG. 3.

In another aspect of the present invention, the blocking layer 144 may overlap the pixel electrode 142 such that a portion of the pixel electrode 142 is between the blocking layer 144 and the passivation layer 140, as illustrated in FIG. 4C.

On the other hand, an absorption layer 152 is formed on an inner surface of the second substrate 150, and a CLC color filter layer, which includes sub color filters 154a and 154b, is formed on the absorption layer 152. Each sub color filter of the CLC color filter layer 154a and 154b corresponds to one pixel area and reflects light of wavelengths corresponding to one of red, green and blue colors. A common electrode 156 is formed on the CLC color filter layer 154a and 154b. The common electrode 156 is made of a transparent conducting material, such as indium-tin-oxide (ITO) or indium-zinc-oxide (IZO).

A liquid crystal layer 160 is disposed between the common electrode 156 and the pixel electrode 142.

A retardation film 172 and a polarizer 174 are subsequently arranged on an outer surface of the first substrate 110. The retardation film 172 may be a quarter wave plate (QWP) having a retardation of λ/4, and the polarizer 174 may be a linear polarizer that transmits only linearly polarized light parallel to its transmission axis.

In the first embodiment of the present invention, the blocking layer 144 corresponding to the channel of the thin film transistor is formed, and the data line 132 has a wider width than the related art. Thus, the data line 132 and the pixel electrode 142 have a wider overlap than that of the related art. That is, over about 50% of the width of the data line 132 overlaps the pixel electrodes 142. For example, if the data line has a width of over 8 μm, the data line 132 overlaps each of the adjacent pixel electrodes 142 by over 2 μm, respectively, because the formidable minimum width of a fine pattern, presently, is about 4 μm and the distance between the adjacent pixel electrodes 142 is about 4 μm. Therefore, since the data line 132 functions as a black matrix and light leakage is blocked around the data line 132, the black matrix can be omitted. Additionally, leakage current in the thin film transistor may be prevented due to the blocking layer 144.

In the first embodiment, the blocking layer 144 is formed between the passivation layer 140 and the pixel electrode 142, and the blocking layer 144 may be formed on the pixel electrode 142.

Figure 5:
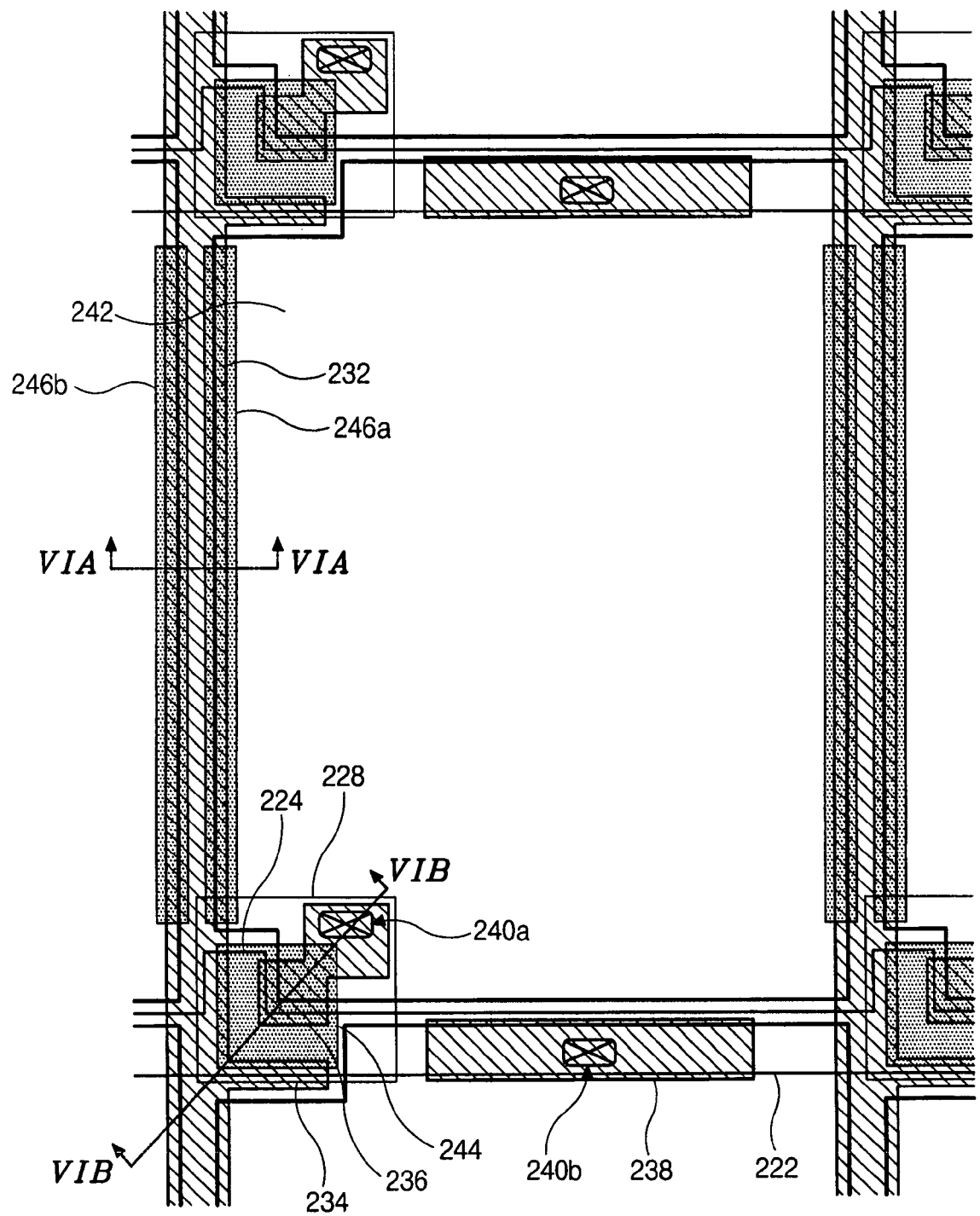
FIG. 5 is a plan view of a reflective LCD device including a CLC color filter according to a second embodiment of the present invention.

FIG. 5 is a plan view of a reflective liquid crystal display (LCD) device including a cholesteric liquid crystal (CLC) color filter according to a second embodiment of the present invention. As shown in FIG. 5, a gate line 222 of a horizontal direction and a data line 232 of a vertical direction in the context of the figure cross each other to define a pixel area. At the crossing of the gate line 222 and the data line 232, a thin film transistor, which includes a gate electrode 224, a source electrode 234 and a drain electrode 236, is formed. The gate electrode 224 is connected to the gate line 222; the source electrode 234 is connected to the data line 232; and the drain electrode 236 is spaced apart from the source electrode 234. The thin film transistor further includes an active layer 228, and the active layer 228 between the source electrode 234 and the drain electrode 236 becomes a channel of the thin film transistor. A passivation layer 240 is formed over the thin film transistor.

A capacitor electrode 238 overlaps the gate line 222 to form a storage capacitor. The capacitor electrode 238 may be made of the same material as the data line 232.

A blocking layer 244 is formed at the crossing of the gate line 222 and the data line 232, and covers the channel of the thin film transistor. Next, a first black matrix 246a and a second black matrix 246b are formed overlapping both sides of the data line 232, respectively.

In the pixel area, a pixel electrode 242 is formed. The pixel electrode 242 is connected to the drain electrode 236 through a drain contact hole 240a through the passivation layer 240 and is connected to the capacitor electrode 238 through a capacitor contact hole 240b through the passivation layer 240. The pixel electrode 242 also overlaps the data line 232, so that the aperture ratio of the LCD device increases.

Although not shown in the figure, a CLC color filter layer is formed, and the CLC color filter layer reflects light of wavelengths corresponding to one of red, green and blue colors by pixel areas.

Figure 6A:
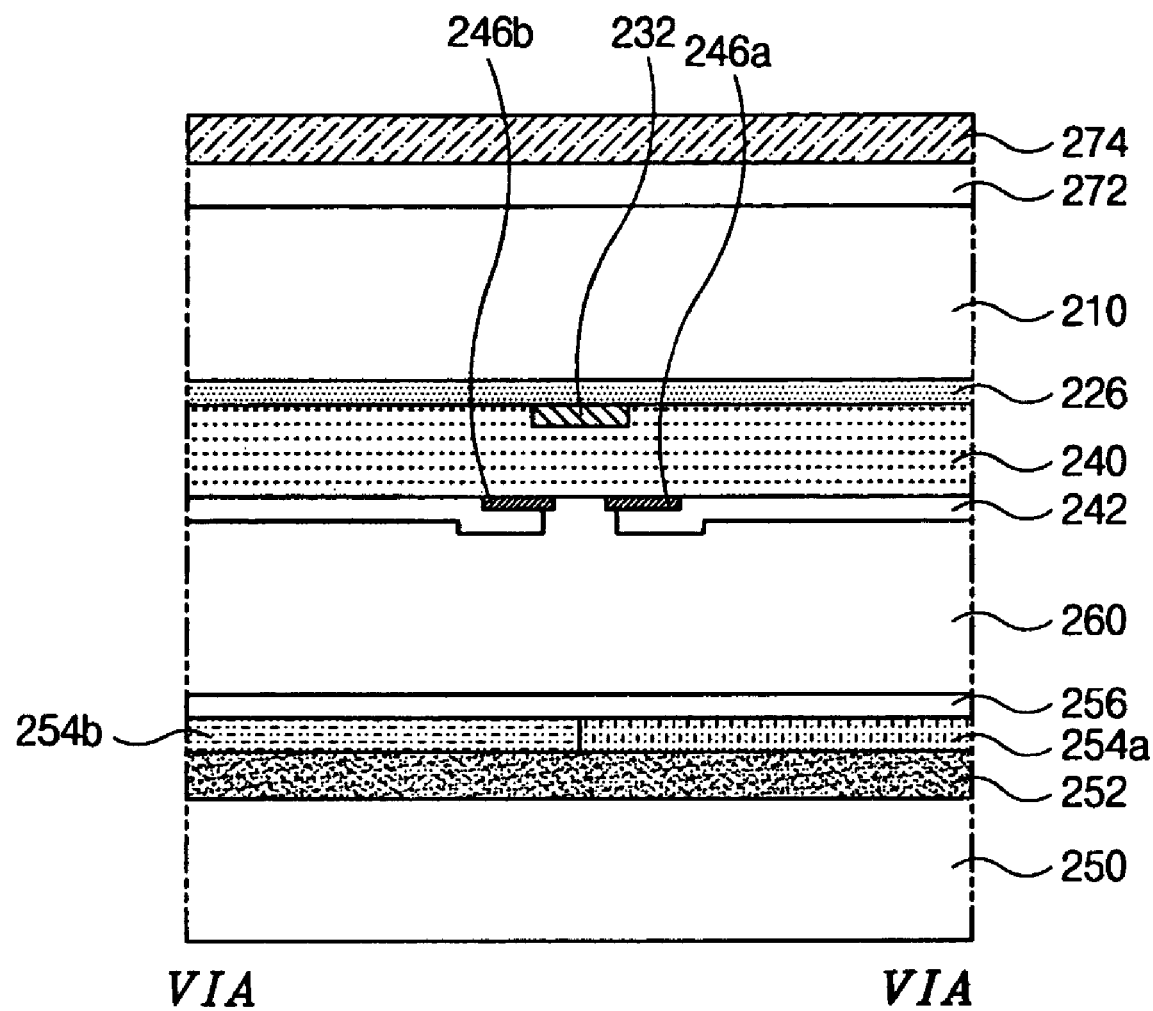
FIGS. 6A and 6B are cross sectional views along the line VIA—VIA and the line VIB—VIB of FIG. 5, respectively.
Figure 6B:
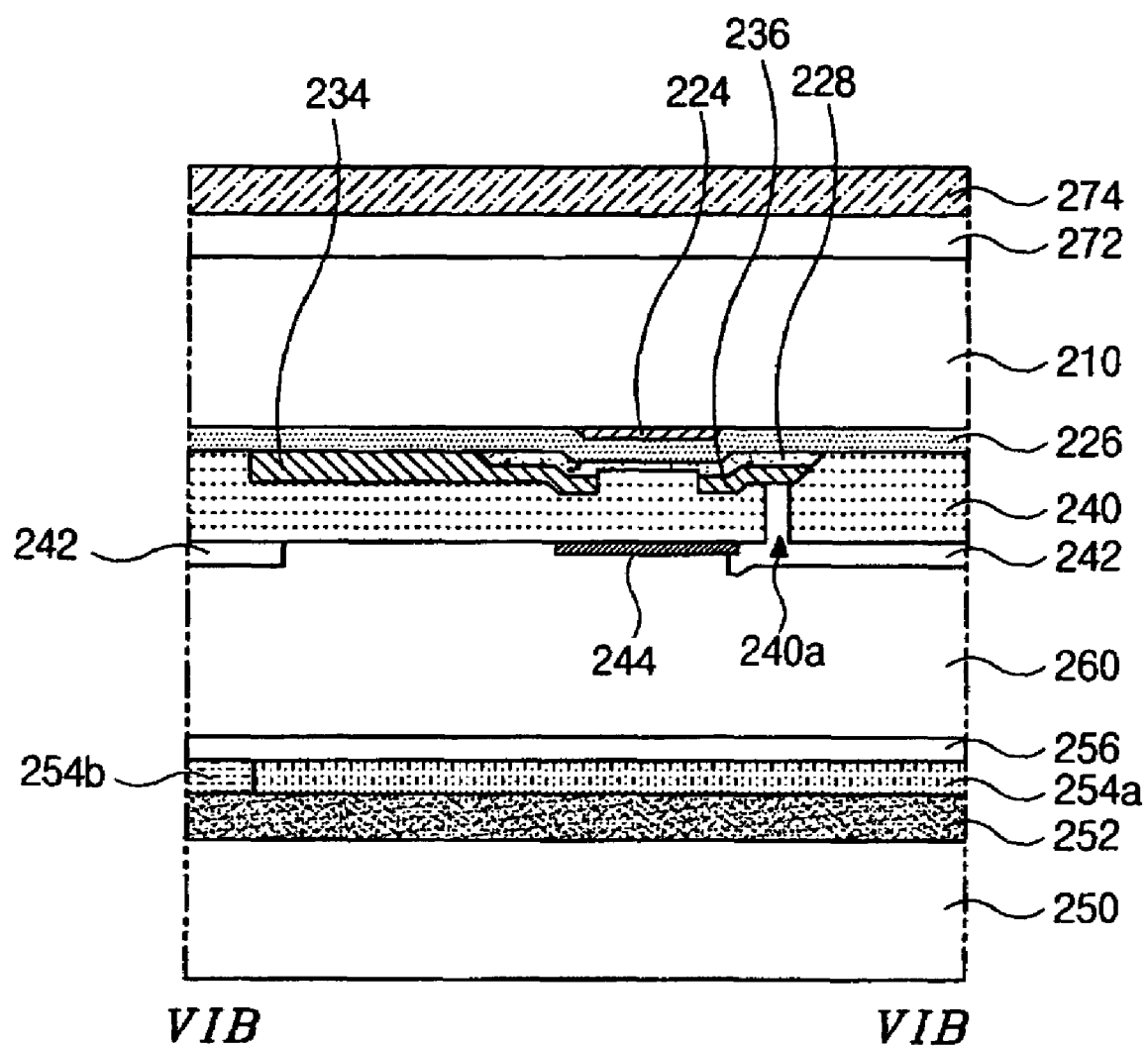

FIGS. 6A and 6B are cross sectional views along the line VIA—VIA and the line VIB—VIB of FIG. 5, respectively.

As shown in the figures, a first substrate 210 and a second substrate 250 are spaced apart and facing each other. The first substrate 210 may be made of a transparent substrate, and the second substrate 250 may be made of either a transparent substrate or an opaque substrate. A gate electrode 224 is formed on an inner surface of the first substrate 210, and a gate insulating layer 226 covers the gate electrode 224. Although not shown in the figures, a gate line 222 of FIG. 5 that is connected to the gate electrode 224 also is formed on the inner surface of the first substrate 210. An active layer 228 is formed on the gate insulating layer 226 over the gate electrode 224, and a source electrode 234 and a drain electrode 236 are formed on the active layer 228. As stated above, the gate electrode 224, the active layer 228, the source electrode 234 and the drain electrode 236 form a thin film transistor, and the active layer 228 exposed between the source electrode 234 and the drain electrode 236 becomes a channel of the thin film transistor. Additionally, a data line 232 and a capacitor electrode 238 of FIG. 5, which may be made of the same material as the source electrode 234 and the drain electrode 236, are formed on the gate insulating layer 226. The data line 232 is connected to the source electrode 234, and crosses the gate line to define a pixel area. The capacitor electrode overlaps the gate line. Although not shown in the figures, an ohmic contact layer may be formed between the active layer 228 and the source electrode 234 and between the active layer 228 and the drain electrode 236 to lower the contact resistance.

A passivation layer 240 is formed on the data line 232, the source electrode 234 and the drain electrode 236. The passivation layer 240 may be made of an organic material having a relatively low dielectric constant, such as benzocyclobutene (BCB) or acrylic resin. The passivation layer 240 includes a drain contact hole 240a exposing the drain electrode 236 and a capacitor contact hole 240b of FIG. 5 exposing the capacitor electrode 238 of FIG. 5.

Next, a blocking layer 244, a first black matrix 246a and a second black matrix 246b are formed on the passivation layer 240. The blocking layer 244 covers the channel of the thin film transistor. The first and second black matrices 246a and 246b extend vertically in the context of figure and overlap both sides of the data line 232, respectively. The blocking layer 244, the first black matrix 246a and the second black matrix 246b may be made of an opaque metal material, such as chromium (Cr).

As illustrated in FIG. 6B, a pixel electrode 242, which may be made of a transparent conducting material, such as indium-tin-oxide (ITO) or indium-zinc-oxide (IZO), may be formed on at least a portion of the blocking layer 244, the first black matrix 246a, the second black matrix 246b, and on the passivation layer 240. The pixel electrode 242 is connected to the drain electrode 236 through the drain contact hole 240a, and overlaps not only the data line 232 but also the first and second black matrices 246a and 246b to increase an aperture ratio of the LCD device. As shown in the figures, the pixel electrode 242 may contact and overlap the blocking layer 244 such that a portion of the blocking layer 244 is between the passivation layer 240 and the pixel electrode 242.

Figure 6C:
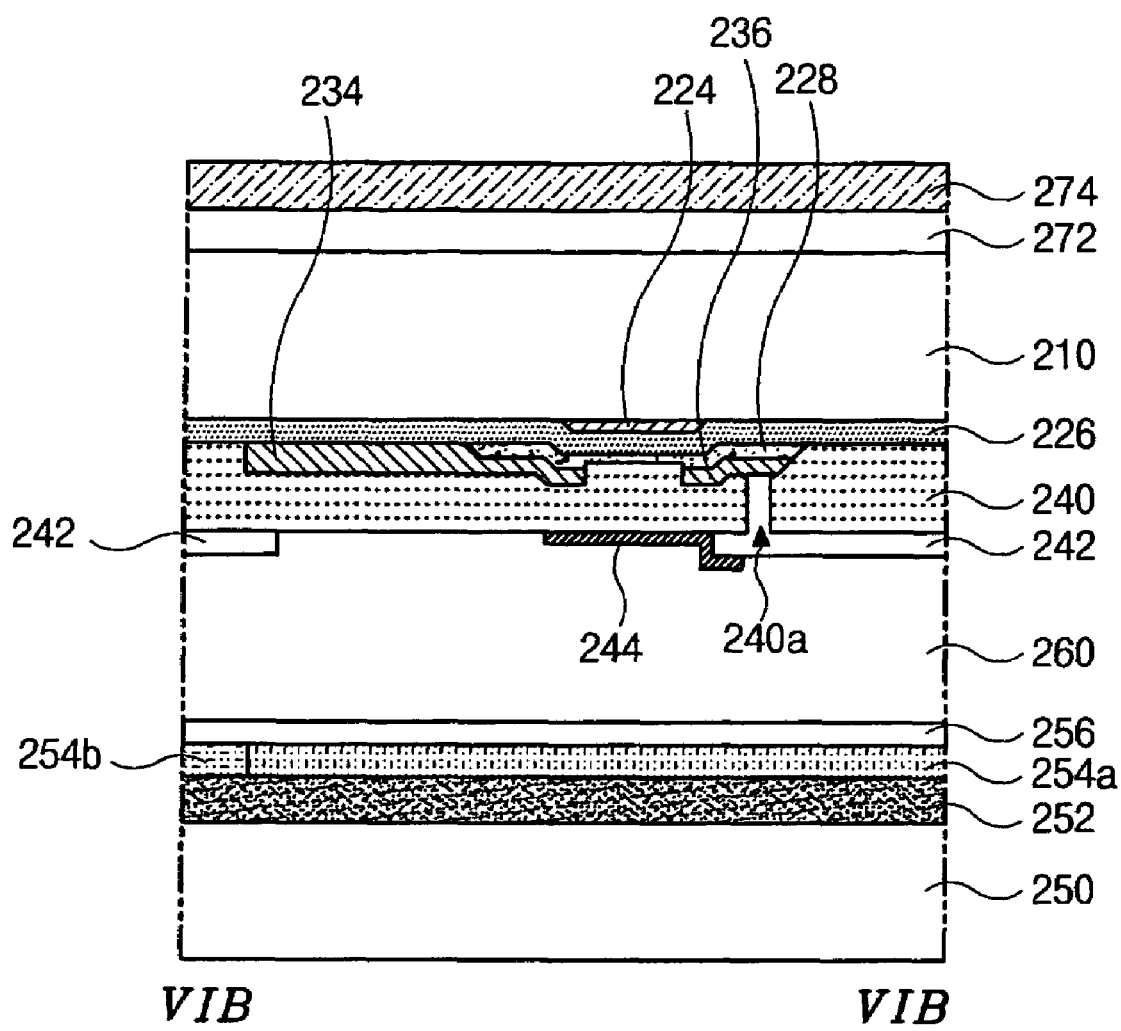
FIG. 6C illustrates another aspect of the present invention along line VIB—VIB of FIG. 5.

In another aspect of the present invention, the blocking layer 244 may overlap the pixel electrode 242 such that a portion of the pixel electrode 242 is between the blocking layer 244 and the passivation layer 240, as illustrated in FIG. 6C.

On the other hand, an absorption layer 252 is formed on an inner surface of the second substrate 250, and a CLC color filter layer, which includes sub color filters 254a and 254b, is formed on the absorption layer 252. Each sub color filter of the CLC color filter layer 254a and 254b corresponds to one pixel area, and reflects light of wavelengths corresponding to one of red, green and blue colors. A common electrode 256 is formed on the CLC color filter layer 254a and 254b. The common electrode 256 is made of a transparent conducting material, such as indium-tin-oxide (ITO) or indium-zinc-oxide (IZO).

A liquid crystal layer 260 is disposed between the common electrode 256 and the pixel electrode 242.

A retardation film 272 and a polarizer 274 are subsequently arranged on an outer surface of the first substrate. 210. The retardation film 272 may be a quarter wave plate (QWP) having a retardation of λ/4, and the polarizer 274 may be a linear polarizer that transmits only linearly polarized light parallel to its transmission axis.

In the second embodiment of the present invention, the blocking layer 244 corresponding to the channel of the thin film transistor is formed, and the first and second black matrices 246a and 246b overlap each side of the data line 232. Therefore, leakage current in the thin film transistor is prevented, and light leakage is blocked around the data line 232. Here, the data line 232 may have the same width as the related art, that is, a width of about 8 μm. Although the blocking layer 244 is formed between the passivation layer 240 and the pixel electrode 242 in the second embodiment, the blocking layer 244 may be formed on the pixel electrode 242.

Meanwhile, the first and second black matrices may be formed under the data line. Such a third embodiment of the present invention will be explained with reference to the following figures.

Figure 7:
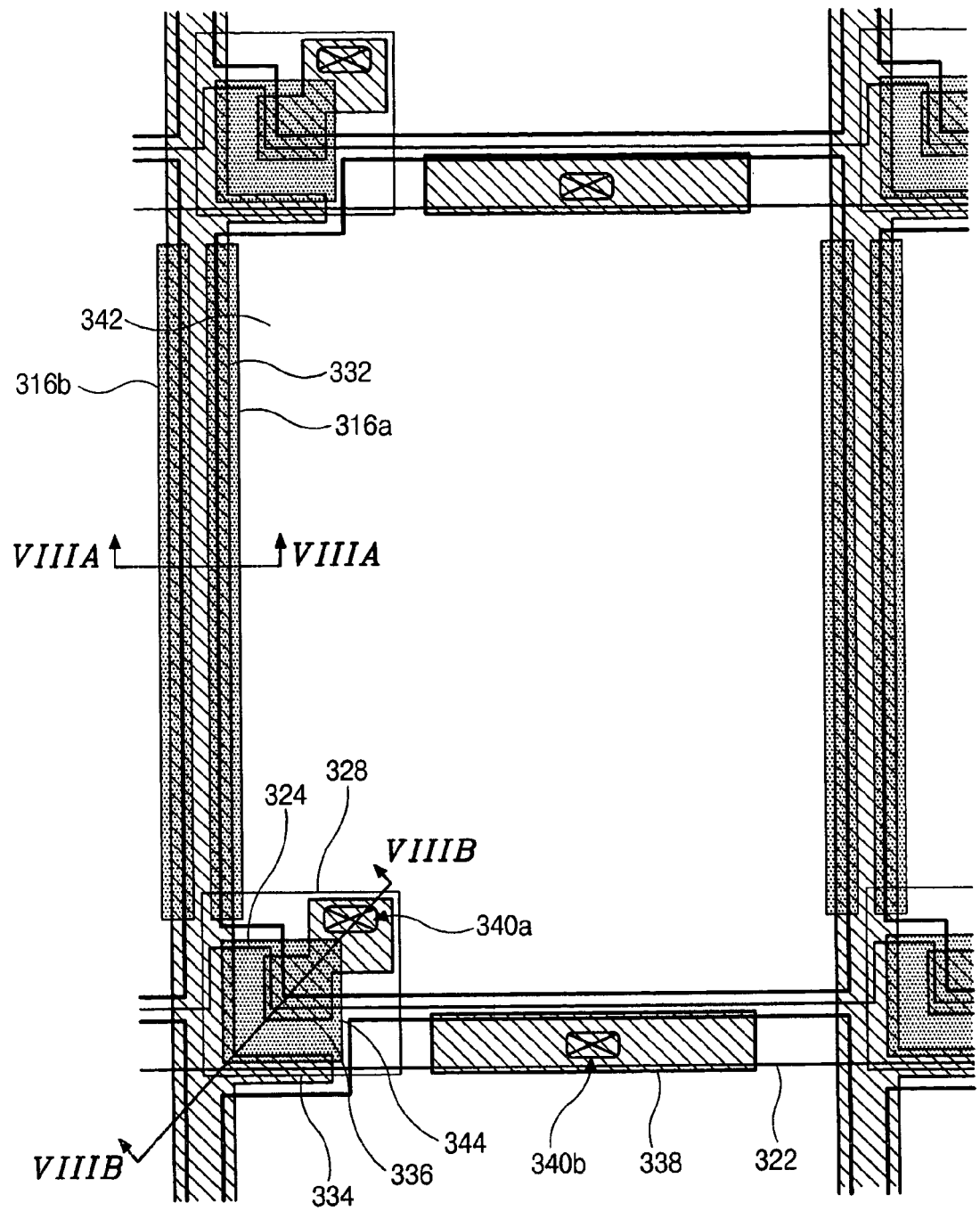
FIG. 7 is a plan view of a reflective LCD device including a CLC color filter according to a third embodiment of the present invention.
Figure 8A:
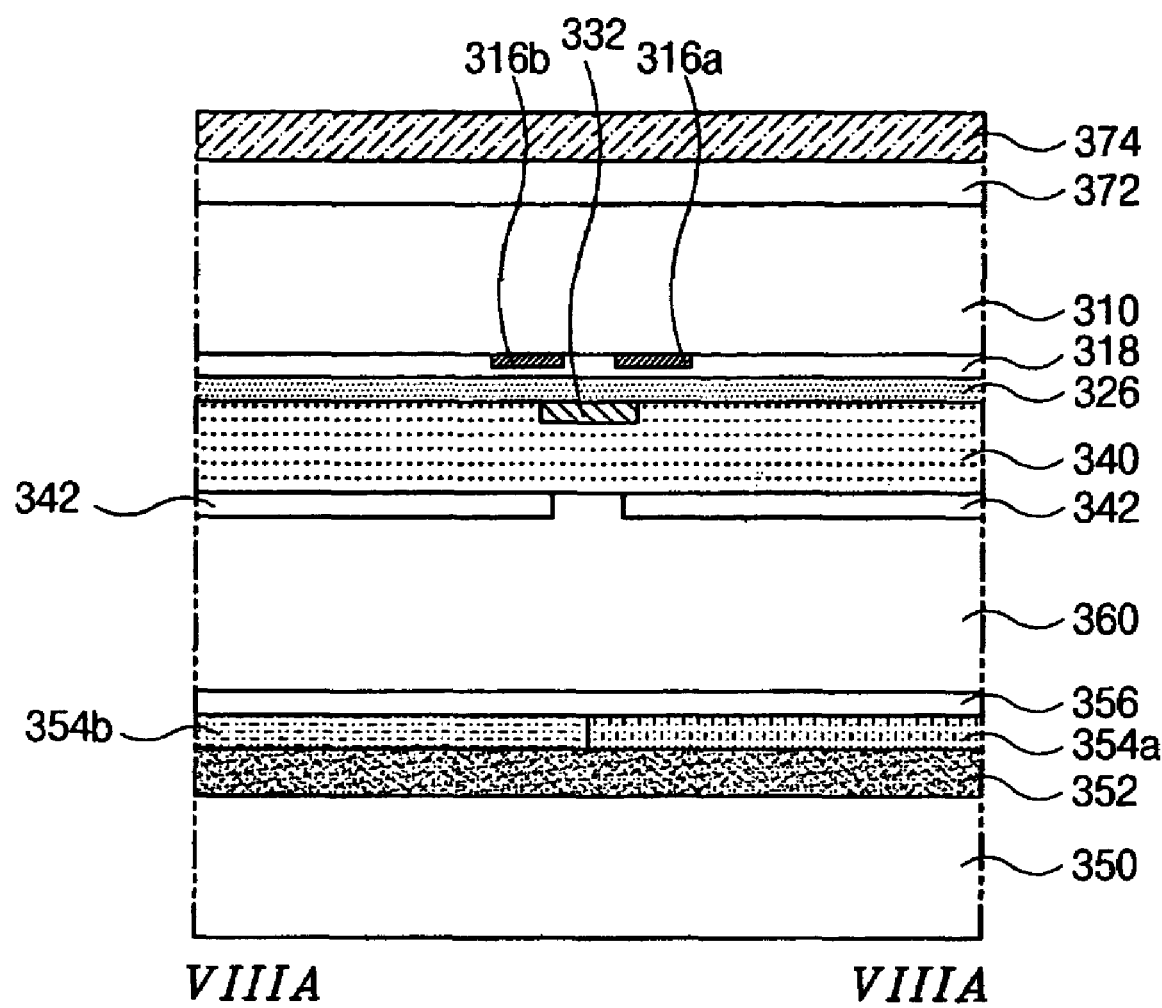
FIGS. 8A and 8B are cross sectional views along the line VIIIA—VIIIA and the line VIIIB—VIIIB of FIG. 7, respectively.
Figure 8B:
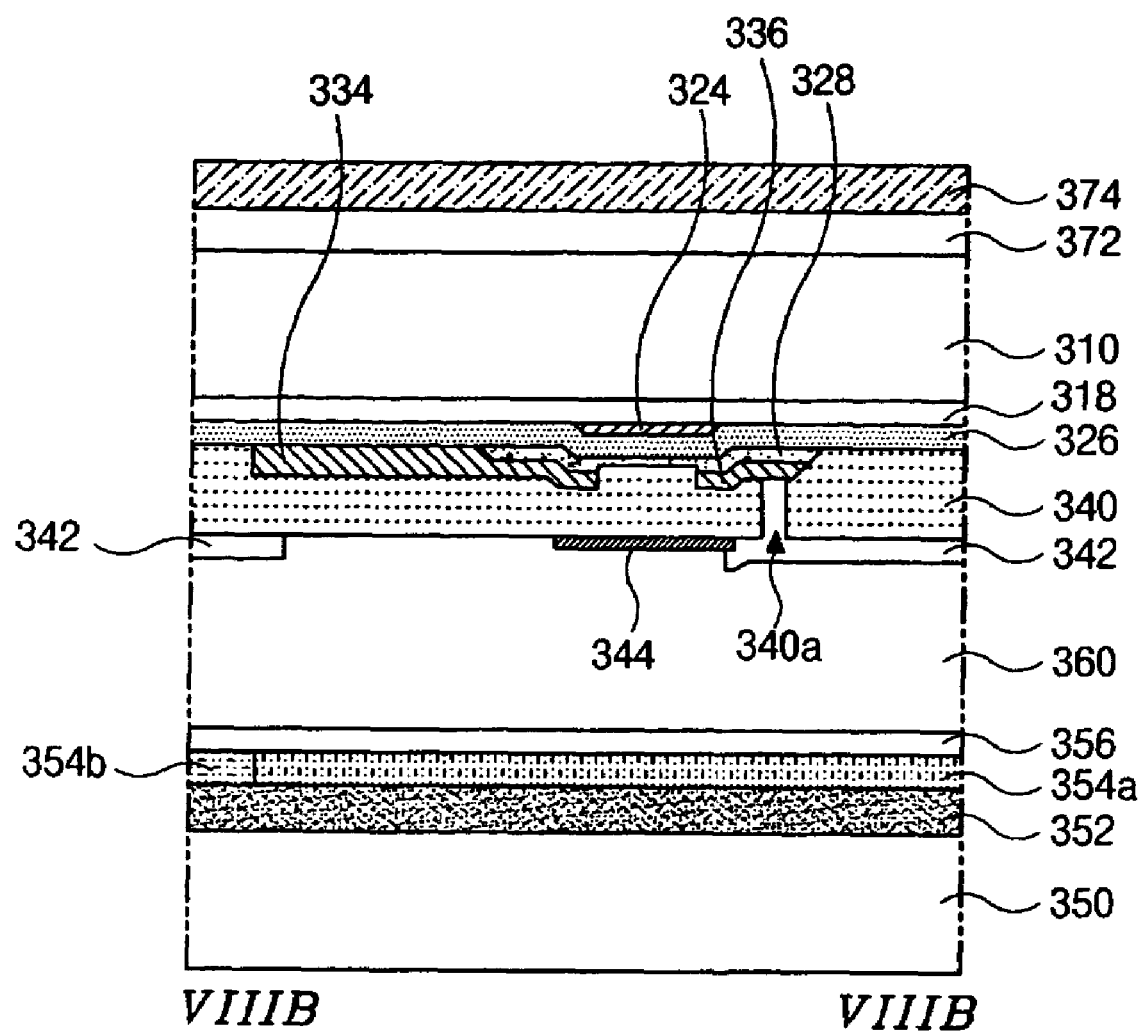
Figure 8C:
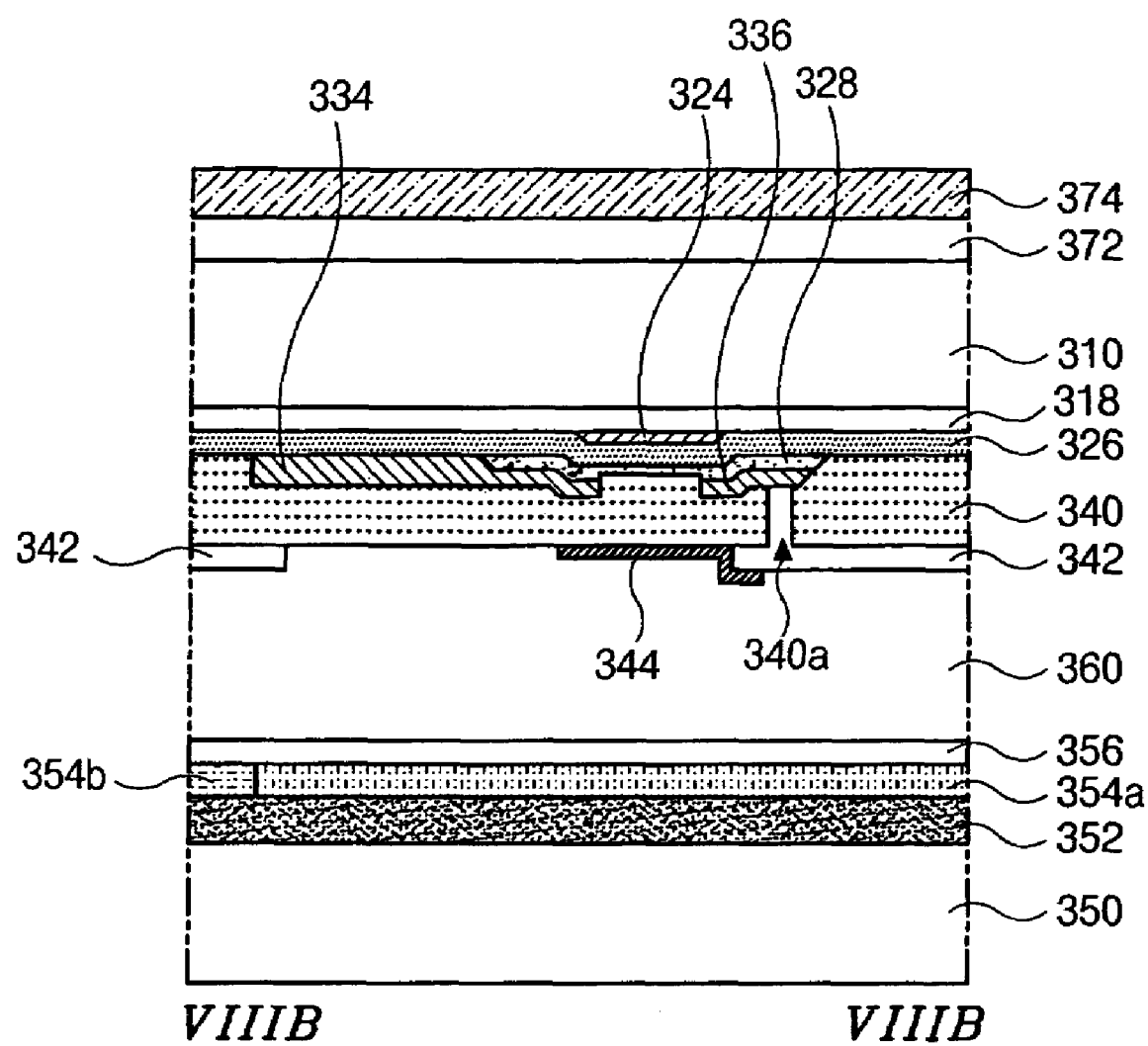
FIG. 8C illustrates another aspect of the present invention along line VIIIB—VIIIB of FIG. 7.

FIG. 7 is a plan view of a reflective liquid crystal display (LCD) device including a cholesteric liquid crystal (CLC) color filter according to a third embodiment of the present invention, and FIGS. 8A and 8B are cross sectional views along the line VIIIA—VIIIA and the line VIIIB—VIIIB of FIG. 7, respectively.

In FIG. 7, the reflective LCD device of the third embodiment has the same plan structure as the second embodiment, although the cross-sectional views differ. Thus, similar reference numbers will be used throughout the drawing to refer to the same or like parts, and thus the explanation about these will be omitted.

Next, as shown in FIGS. 8A and 8B, a first substrate 310 and a second substrate 350 are spaced apart and facing each other. The first substrate 310 may be made of a transparent substrate, and the second substrate 350 may be made of either a transparent substrate or an opaque substrate. A first black matrix 316a and a second black matrix 316b are formed on an inner surface of the first substrate 310, and an overcoat layer 318 covers the first and second black matrices 316a and 316b. The first and second black matrices 316a and 316b may be made of an opaque metal material. A gate electrode 324 is formed on the overcoat layer 318, and a gate insulating layer 326 covers the gate electrode 324. Although not shown in the figures, a gate line 322 of FIG. 7 that is connected to the gate electrode 324 also is formed on the overcoat layer 318. An active layer 328 is formed on the gate insulating layer 326 over the gate electrode 324, and a source electrode 334 and a drain electrode 336 are formed on the active layer 328. As stated above, the gate electrode 324, the active layer 328, the source electrode 334 and the drain electrode 336 form a thin film transistor, and the active layer 328 exposed between the source electrode 334 and the drain electrode 336 becomes a channel of the thin film transistor. Moreover, a data line 332, which may be made of the same material as the source electrode 334 and the drain electrode 336, is formed on the gate insulating layer 326. The data line 332 is connected to the source electrode 334 and crosses the gate line to define a pixel area. The data line 332 overlaps the first and second black matrices 316a and 316b. Although not shown in the figures, an ohmic contact layer may be formed between the active layer 328 and the source electrode 334 and between the active layer 328 and the drain electrode 336 to lower the contact resistance.

A passivation layer 340 is formed on the data line 332, the source electrode 334 and the drain electrode 336. The passivation layer 340 may be made of an organic material having a relatively low dielectric constant, such as benzocyclobutene (BCB) or acrylic resin. The passivation layer 340 includes a drain contact hole 340a exposing the drain electrode 336.

Next, a blocking layer 344 is formed on the passivation layer 340, and covers the channel of the thin film transistor. The blocking layer 344 may be made of an opaque metal material, such as chromium (Cr).

As illustrated in FIG. 8B, a pixel electrode 342, which may be made of a transparent conducting material, such as indium-tin-oxide (ITO) or indium-zinc-oxide (IZO), may be formed on at least a portion of the blocking layer 344 and on the passivation layer 340. The pixel electrode 342 is connected to the drain electrode 336 through the drain contact hole 340a, and overlaps not only the data line 332 but also the first and second black matrices 316a and 316b to increase an aperture ratio of the LCD device. As shown in the figures, the pixel electrode 342 may contact and overlap the blocking layer 344 such that a portion of the blocking layer 344 is between the passivation layer 340 and the pixel electrode 342.

In another aspect of the present invention, the blocking layer 344 may overlap the pixel electrode 342 such that a portion of the pixel electrode 342 is between the blocking layer 344 and the passivation layer 340, as illustrated in FIG. 6C.

On the other hand, an absorption layer 352 is formed on an inner surface of the second substrate 350, and a CLC color filter layer, which includes sub color filters 354a and 354b, is formed on the absorption layer 352. Each sub color filter of the CLC color filter layer 354a and 354b corresponds to one pixel area, and reflects light of wavelengths corresponding to one of red, green and blue colors. A common electrode 356 is formed on the CLC color filter layer 354a and 354b. The common electrode 356 is made of a transparent conducting material, such as indium-tin-oxide (ITO) or indium-zinc-oxide (IZO).

A liquid crystal layer 360 is disposed between the common electrode 356 and the pixel electrode 342.

A retardation film 372 and a polarizer 374 are subsequently arranged on an outer surface of the first substrate 310. The retardation film 372 may be a quarter wave plate (QWP) having a retardation of $\lambda/4$, and the polarizer 374 may be a linear polarizer that transmits only linearly polarized light parallel to its transmission axis.

In the third embodiment of the present invention, the blocking layer 344 corresponding to the channel of the thin film transistor is formed, and the first and second black matrices 316a and 316b overlapping each side of the data line 332 are formed under the data line 332. Therefore, leakage current in the thin film transistor is prevented and light leakage is blocked around the data line 332. Here, the data line 332 may have a width of about 8 μm. Although the blocking layer 344 is formed between the passivation layer 340 and the pixel electrode 342 in the third embodiment, the blocking layer 344 may be formed on the pixel electrode 342.

In the third embodiment, the overcoat layer may be omitted, and such a fourth embodiment of the present invention will be explained with reference to the following figures.

Figure 9:
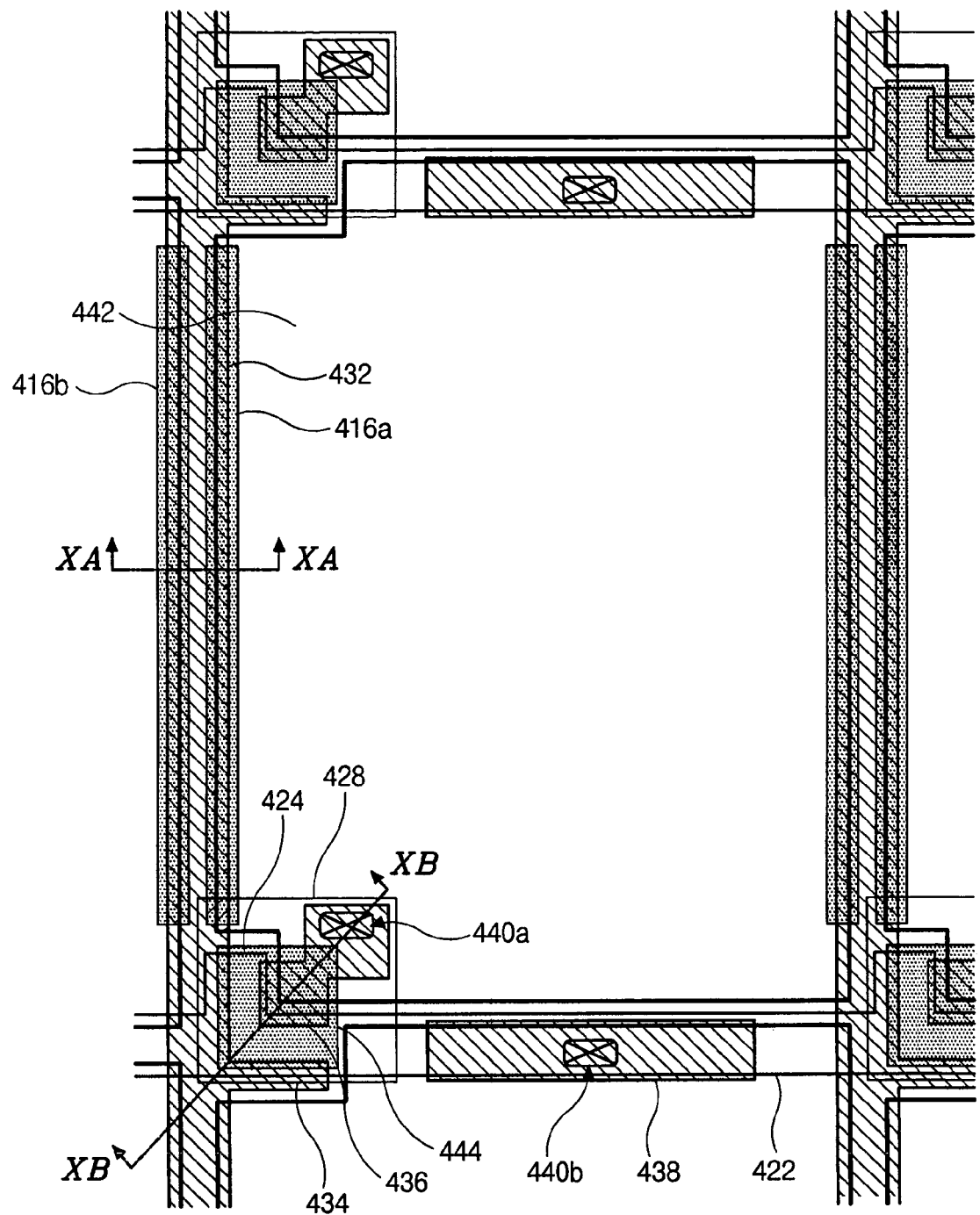
FIG. 9 is a plan view of a reflective LCD device including a CLC color filter according to a fourth embodiment of the present invention.
Figure 10A:
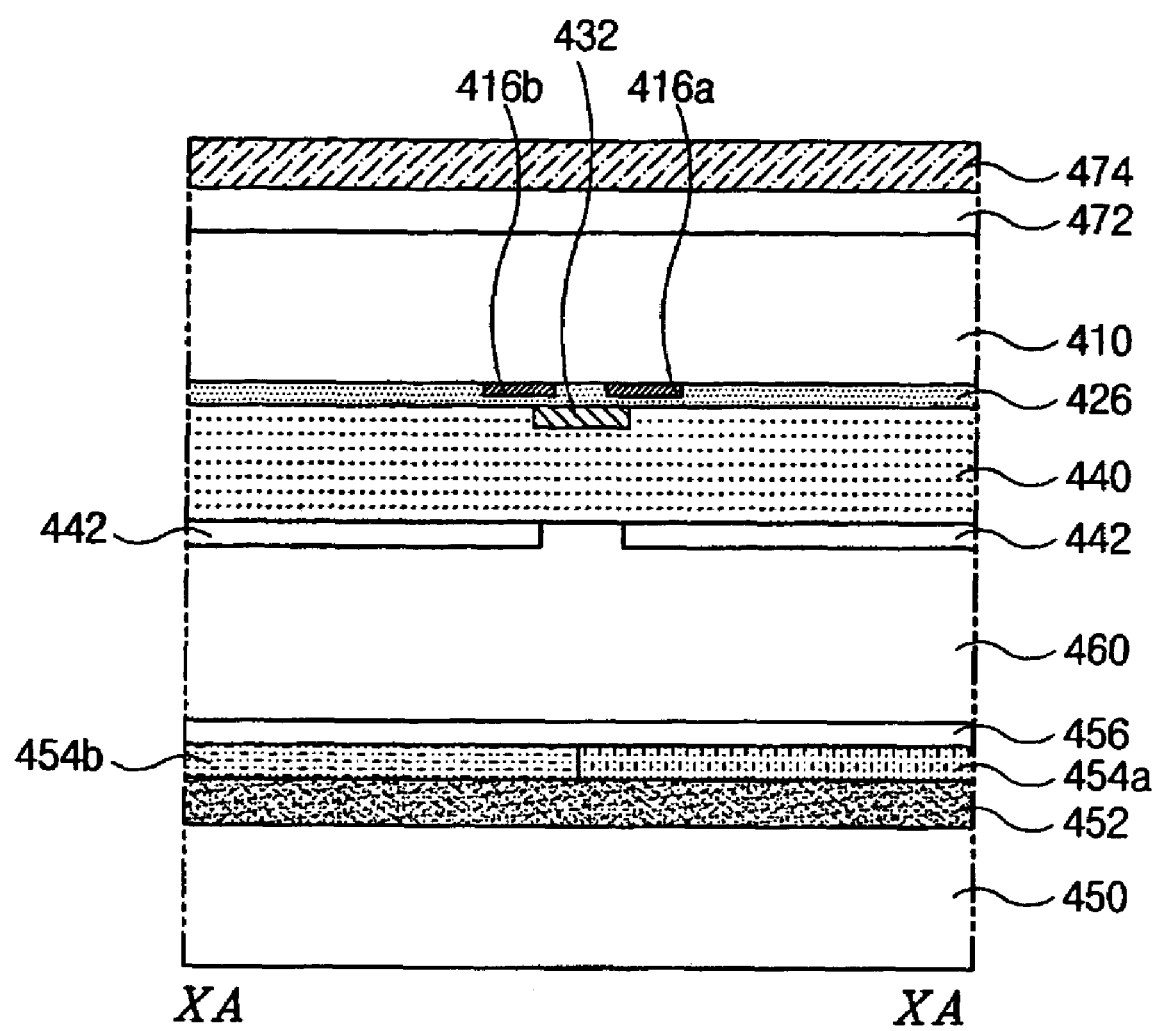
FIGS. 10A and 10B are cross sectional views along the line XA—XA and the line XB—XB of FIG. 9, respectively.
Figure 10B:
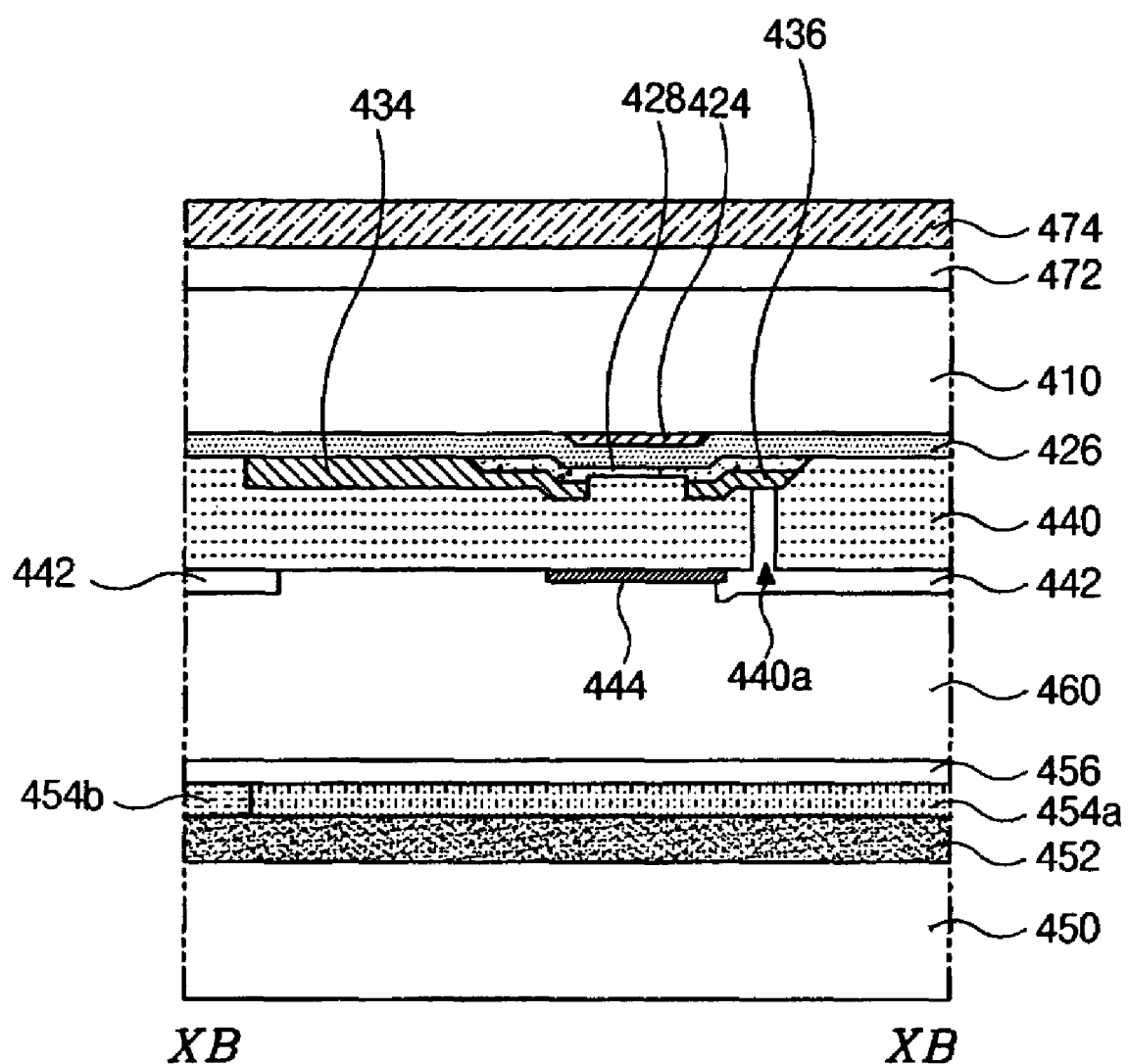

FIG. 9 is a plan view of a reflective liquid crystal display (LCD) device including a cholesteric liquid crystal (CLC) color filter according to a fourth embodiment of the present invention, and FIGS. 10A and 10B are cross sectional views along the line XA—XA and the line XB—XB of FIG. 9, respectively.

In FIG. 9, the reflective LCD device of the fourth embodiment has the same plan structure as the third embodiment. Thus, similar reference numbers will be used throughout the drawing to refer to the same or like parts, and thus the explanation about these will be omitted.

Next, as shown in FIGS. 10A and 10B, a first substrate 410 and a second substrate 450 are spaced apart and facing each other. The first substrate 410 may be made of a transparent substrate, and the second substrate 450 may be made of either a transparent substrate or an opaque substrate. A first black matrix 416a and a second black matrix 416b are formed on an inner surface of the first substrate 410. Also, a gate electrode 424 and a gate line (not shown) are formed on the inner surface of the first substrate 410, and a gate insulating layer 426 covers the gate electrode 424 and the gate line. The first and second black matrices 416a and 416b may be formed of the same material as the gate electrode 424. An active layer 428 is formed on the gate insulating layer 426 over the gate electrode 424, and a source electrode 434 and a drain electrode 436 are formed on the active layer 428. As stated above, the gate electrode 424, the active layer 428, the source electrode 434 and the drain electrode 436 form a thin film transistor, and the active layer 428 exposed between the source electrode 434 and the drain electrode 436 becomes a channel of the thin film transistor. Moreover, a data line 432, which may be made of the same material as the source electrode 434 and the drain electrode 436, is formed on the gate insulating layer 426. The data line 432 is connected to the source electrode 434 and crosses the gate line to define a pixel area. The data line 432 overlaps the first and second black matrices 416a and 416b. Although not shown in the figures, an ohmic contact layer may be formed between the active layer 428 and the source electrode 434 and between the active layer 428 and the drain electrode 436 to lower the contact resistance.

A passivation layer 440 is formed on the data line 432, the source electrode 434 and the drain electrode 436. The passivation layer 440 may be made of an organic material having a relatively low dielectric constant, such as benzocyclobutene (BCB) or acrylic resin. The passivation layer 440 includes a drain contact hole 440a exposing the drain electrode 336.

Next, a blocking layer 444 is formed on the passivation layer 440 and covers the channel of the thin film transistor. The blocking layer 444 may be made of an opaque metal material, such as chromium (Cr).

As illustrated in FIG. 10B, a pixel electrode 442, which may be made of a transparent conducting material, such as indium-tin-oxide (ITO) or indium-zinc-oxide (IZO), may be formed on at least a portion of the blocking layer 444 and on the passivation layer 440. The pixel electrode 442 is connected to the drain electrode 436 through the drain contact hole 440a and overlaps not only the data line 432, but also the first and second black matrices 416a and 416b to increase an aperture ratio of the LCD device. As shown in the figures, the pixel electrode 442 may contact and overlap the blocking layer 444 such that a portion of the blocking layer 444 is between the passivation layer 440 and the pixel electrode 442.

Figure 10C:
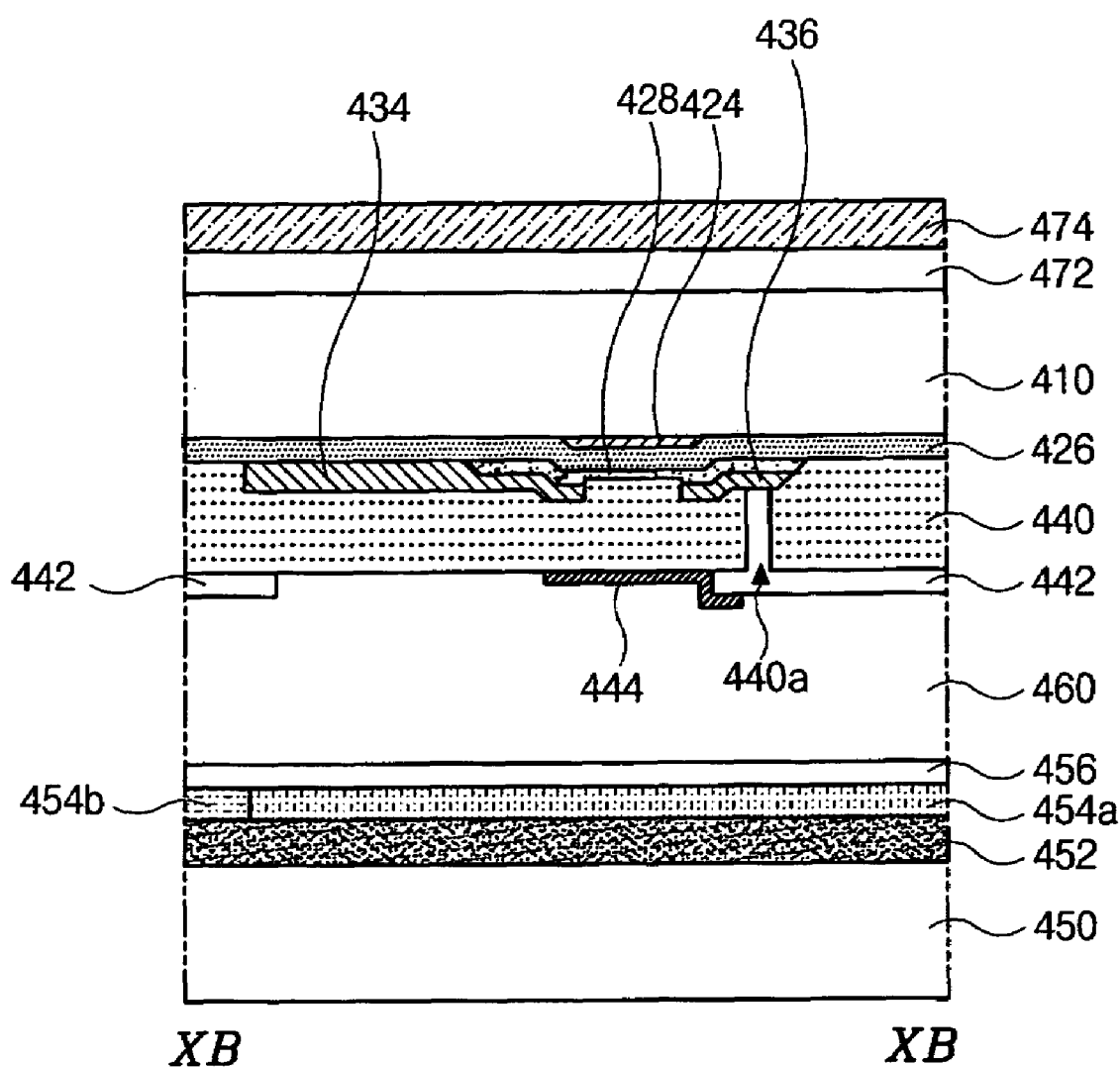
FIG. 10C illustrates another aspect of the present invention along line XB—XB of FIG. 9.

In another aspect of the present invention, the blocking layer 444 may overlap the pixel electrode 442 such that a portion of the pixel electrode 442 is between the blocking layer 444 and the passivation layer 440, as illustrated in FIG. 10C.

On the other hand, an absorption layer 452 is formed on an inner surface of the second substrate 450, and a CLC color filter layer, which includes sub color filters 354a and 454b, is formed on the absorption layer 452. Each sub color filter of the CLC color filter layer 454a and 454b corresponds to one pixel area and reflects light of wavelengths corresponding to one of red, green and blue colors. A common electrode 456 is formed on the CLC color filter layer 454a and 454b. The common electrode 456 is made of a transparent conducting material, such as indium-tin-oxide (ITO) or indium-zinc-oxide (IZO).

A liquid crystal layer 460 is disposed between the common electrode 456 and the pixel electrode 442.

A retardation film 472 and a polarizer 474 are subsequently arranged on an outer surface of the first substrate 410. The retardation film 472 may be a quarter wave plate (QWP) having a retardation of $\lambda/4$, and the polarizer 474 may be a linear polarizer that transmits only linearly polarized light parallel to its transmission axis.

In the fourth embodiment of the present invention, the blocking layer 444 corresponding to the channel of the thin film transistor is formed, and the first and second black matrices 416a and 416b overlapping each side of the data line 432 are formed under the data line 432. Therefore, leakage current in the thin film transistor is prevented and light leakage is blocked around the data line 432. Here, the data line 432 may have a width of about 8 μm. Although the blocking layer 444 is formed between the passivation layer 440 and the pixel electrode 442 in the second embodiment, the blocking layer 444 may be formed on the pixel electrode 442.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A reflective liquid crystal display device, comprising:
   first and second substrates spaced apart and facing each other;
   a gate line and a data line on an inner surface of the first substrate and crossing each other to define a pixel area;
   a thin film transistor corresponding to each pixel area electrically connected to the gate and data lines;
   a passivation layer covering the thin film transistor;
   a blocking layer on the passivation layer and corresponding to the thin film transistor;
   a pixel electrode corresponding to each pixel area on the passivation layer and connected to the thin film transistor;
   a retardation film on an outer surface of the first substrate;
   a polarizer on the retardation film;
   a color filter layer on the second substrate;
   a common electrode on the color filter layer; and
   a liquid crystal layer between the common electrode and the pixel electrode,
   wherein the blocking layer is made of a metal material,
   wherein the data line overlaps an adjacent portion of the pixel electrode by an overlapping width between about 50% and about 100% of a width of the data line.

2. A reflective liquid crystal display device, comprising:
   first and second substrates spaced apart and facing each other;
   a gate line and a data line on an inner surface of the first substrate and crossing each other to define a pixel area;
   a thin film transistor corresponding to each pixel area electrically connected to the gate and data lines;
   a passivation layer covering the thin film transistor;
   a blocking layer on the passivation layer and corresponding to the thin film transistor;
   a pixel electrode corresponding to each pixel area on the passivation layer and connected to the thin film transistor;
   a retardation film on an outer surface of the first substrate;
   a polarizer on the retardation film;
   a color filter layer on the second substrate;
   a common electrode on the color filter layer; and
   a liquid crystal layer between the common electrode and the pixel electrode,
   wherein the blocking layer is made of a metal material,
   wherein a portion of the width of the data not overlapped by the pixel electrode is less than about 50%.

3. A reflective liquid crystal display device, comprising:
   first and second substrates spaced apart and facing each other;
   a gate line and a data line on an inner surface of the first substrate and crossing each other to define a pixel area;
   a thin film transistor corresponding to each pixel area electrically connected to the gate and data lines;
   a passivation layer covering the thin film transistor;
   a blocking layer on the passivation layer and corresponding to the thin film transistor;
   a pixel electrode corresponding to each pixel area on the passivation layer and connected to the thin film transistor;
   a retardation film on an outer surface of the first substrate;
   a polarizer on the retardation film;
   an absorption layer on an inner surface of the second substrate;
   a color filter layer on the second substrate, wherein the color filter layer is a cholesteric liquid crystal color filter layer;
   a common electrode on the color filter layer;
   a liquid crystal layer between the common electrode and the pixel electrode,
   wherein the blocking layer is made of a metal material.

4. A reflective liquid crystal display device, comprising:
   first and second substrates spaced apart and facing each other;
   a gate line and a data line on an inner surface of the first substrate and crossing each other to define a pixel area;
   a thin film transistor corresponding to each pixel area electrically connected to the gate and data lines;
   a passivation layer covering the thin film transistor;
   a blocking layer on the passivation layer and corresponding to the thin film transistor;
   a pixel electrode corresponding to each pixel area on the passivation layer and connected to the thin film transistor;
   a retardation film on an outer surface of the first substrate;
   a polarizer on the retardation film;
   a reflective layer on an inner surface of the second substrate;
   a color filter layer on the second substrate, wherein the color filter layer is a absorption type color filter layer;
   a common electrode on the color filter layer; and
   a liquid crystal layer between the common electrode and the pixel electrode,
   wherein the blocking layer is made of a metal material.

5. The device according to claim 4, wherein the blocking layer includes chromium.

6. The device according to claim 4, wherein at least a portion of the blocking layer is disposed between the passivation layer and the pixel electrode.

7. A reflective liquid crystal display device, comprising:
   first and second substrates spaced apart and facing each other;
   a gate line and a data line on an inner surface of the first substrate and crossing each other to define a pixel area;
   a thin film transistor corresponding to each pixel area electrically connected to the gate and data lines;
   a passivation layer covering the thin film transistor;
   a blocking layer on the passivation layer and corresponding to the thin film transistor;
   a pixel electrode corresponding to each pixel area on the passivation layer and connected to the thin film transistor;
   a retardation film on an outer surface of the first substrate;
   a polarizer on the retardation film;
   a color filter layer on the second substrate;
   a common electrode on the color filter layer; and
   a liquid crystal layer between the common electrode and the pixel electrode,
   wherein the blocking layer is made of a metal material,
   wherein the blocking layer is disposed on the pixel electrode.

8. The device according to claim 4, wherein the passivation layer includes one of benzocyclobutene and acrylic resin.

9. A reflective liquid crystal display device, comprising:
   first and second substrates spaced apart and facing each other;

a gate line and a data line on an inner surface of the first substrate and crossing each other to define a pixel area;

a thin film transistor electrically connected to the gate and data lines;

a passivation layer covering the thin film transistor;

a blocking layer on the passivation layer and corresponding to the thin film transistor;

first and second black matrices on the passivation layer and overlapping respective sides of the data line;

a pixel electrode on the passivation layer, the pixel electrode connected to the thin film transistor and overlapping the first and second black matrices;

a retardation film on an outer surface of the first substrate;

a polarizer on the retardation film;

a color filter layer on the second substrate;

a common electrode on the color filter layer; and a liquid crystal layer between the common electrode, and the pixel electrode.

10. The device according to claim 9, further comprising an absorption layer on an inner surface of the second substrate, wherein the color filter layer is a cholesteric liquid crystal color filter layer.

11. The device according to claim 9, further comprising an reflective layer on an inner surface of the second substrate, wherein the color filter layer is a absorption type color filter layer.

12. The device according to claim 9, wherein the pixel electrode overlaps adjacent data lines.

13. The device according to claim 9, wherein the first and second black matrices are made of the same material as the blocking layer.

14. The device according to claim 9, wherein the blocking layer is made of a metal material.

15. The device according to claim 14, wherein the blocking layer includes chromium.

16. The device according to claim 9, wherein the blocking layer is disposed between the passivation layer and the pixel electrode.

17. The device according to claim 9, wherein the blocking layer is disposed on the pixel electrode.

18. A reflective liquid crystal display device, comprising:
first and second substrates spaced apart and facing each other;
first and second black matrices on an inner surface of the first substrate;
a plurality of gate lines on the inner surface of the first substrate;
a plurality of data lines crossing the gate lines to define pixel areas and overlapping the first and second black matrices;
a thin film transistor electrically connected to the gate and data lines;
a passivation layer covering the thin film transistor;
a blocking layer on the passivation layer and corresponding to the thin film transistor;
a pixel electrode on the passivation layer, the pixel electrode connected to the thin film transistor and overlapping the first and second black matrices;
a retardation film on an outer surface of the first substrate;
a polarizer on the retardation film;
a color filter layer on the second substrate;
a common electrode on the color filter layer; and
a liquid crystal layer between the common electrode and the pixel electrode.

19. The device according to claim 18, further comprising an absorption layer on an inner surface of the second substrate, wherein the color filter layer is a cholesteric liquid crystal color filter layer.

20. The device according to claim 18, further comprising an reflective layer on an inner surface of the second substrate, wherein the color filter layer is a absorption type color filter layer.

21. The device according to claim 18, wherein the pixel electrode overlaps adjacent data lines.

22. The device according to claim 18, wherein the first and second black matrices are made of the same material as the gate lines.

23. The device according to claim 18, further comprising an overcoat layer between the first and second black matrices and the gate lines.

24. The device according to claim 18, wherein the blocking layer is made of a metal material.

25. The device according to claim 18, wherein the blocking layer is disposed between the passivation layer and the pixel electrode.

26. The device according to claim 18, wherein the blocking layer is disposed on the pixel electrode.

* * * * *